US011083962B2

(12) United States Patent
Ishii et al.

(10) Patent No.: US 11,083,962 B2
(45) Date of Patent: Aug. 10, 2021

(54) SYSTEM, METHOD, AND DEVICE FOR PROCESSING GAME

(71) Applicant: GREE, INC., Tokyo (JP)

(72) Inventors: Shota Ishii, Tokyo (JP); Masayuki Nishida, Tokyo (JP); Takahiro Fukumoto, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 16/555,318

(22) Filed: Aug. 29, 2019

(65) Prior Publication Data

US 2020/0070048 A1   Mar. 5, 2020

(30) Foreign Application Priority Data

Aug. 31, 2018 (JP) .............................. JP2018-163604

(51) Int. Cl.
*A63F 13/35* (2014.01)
*H04L 12/58* (2006.01)

(52) U.S. Cl.
CPC .............. *A63F 13/35* (2014.09); *H04L 51/28* (2013.01); *H04L 51/32* (2013.01)

(58) Field of Classification Search
CPC ...................................................... A63F 13/35
See application file for complete search history.

(56) References Cited

U.S. PATENT DOCUMENTS

| | | | | |
|---|---|---|---|---|
| 2002/0062316 A1* | 5/2002 | Maehiro | ............... | G06Q 10/107 |
| 2002/0086732 A1* | 7/2002 | Kirmse | ................. | A63F 13/795 |
| | | | | 463/42 |
| 2006/0178216 A1* | 8/2006 | Shea | ...................... | A63F 13/352 |
| | | | | 463/42 |
| 2007/0123353 A1* | 5/2007 | Smith | ..................... | A63F 13/12 |
| | | | | 463/42 |
| 2007/0218997 A1* | 9/2007 | Cho | ....................... | A63F 13/795 |
| | | | | 463/42 |
| 2007/0238526 A1* | 10/2007 | Chandranmenon | ..... | H04L 67/24 |
| | | | | 463/42 |
| 2008/0004117 A1* | 1/2008 | Stamper | .................. | A63F 13/30 |
| | | | | 463/42 |
| 2008/0215994 A1* | 9/2008 | Harrison | ................. | A63F 13/42 |
| | | | | 715/757 |
| 2011/0092282 A1* | 4/2011 | Gary | ..................... | A63F 13/837 |
| | | | | 463/31 |
| 2013/0252728 A1* | 9/2013 | Kaneyoshi | ............. | A63F 13/48 |
| | | | | 463/29 |
| 2013/0274001 A1* | 10/2013 | de Jesus | ................. | A63F 13/35 |
| | | | | 463/25 |

(Continued)

FOREIGN PATENT DOCUMENTS

JP         2013128583 A       7/2013

*Primary Examiner* — David L Lewis
*Assistant Examiner* — Shauna-Kay Hall
(74) *Attorney, Agent, or Firm* — Oliff PLC

(57) ABSTRACT

During execution of a game, a user terminal sends, to a first server, a message sending request for sending a message without specifying a recipient. Responsive to receiving the message sending request, the first server selects a user specified as the recipient of the message. The first server sends, to a second server, a message sending request for sending the message while specifying the selected user as the recipient and indicating a game management account as a sender.

11 Claims, 13 Drawing Sheets

(56) References Cited

U.S. PATENT DOCUMENTS

2014/0351339 A1* 11/2014 Kaneoka ............... A63F 13/355
                                                      709/204
2016/0330160 A1* 11/2016 Shan ................... H04L 65/4076
2016/0352816 A1* 12/2016 Xiao ....................... H04L 67/00
2018/0296928 A1* 10/2018 Vaccari ................. H04L 51/046

* cited by examiner

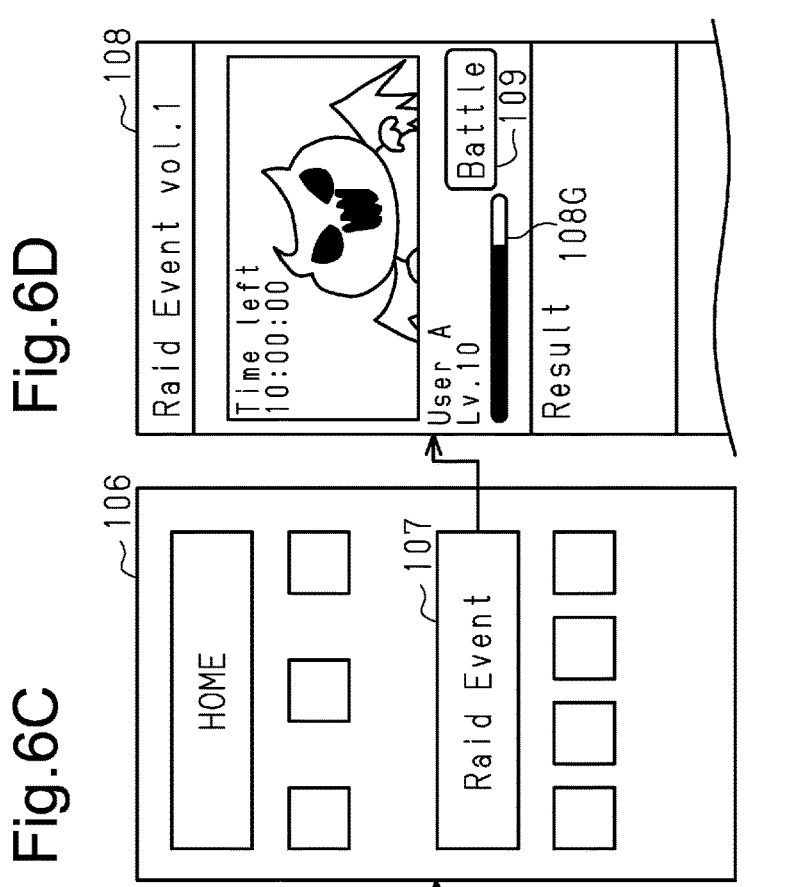
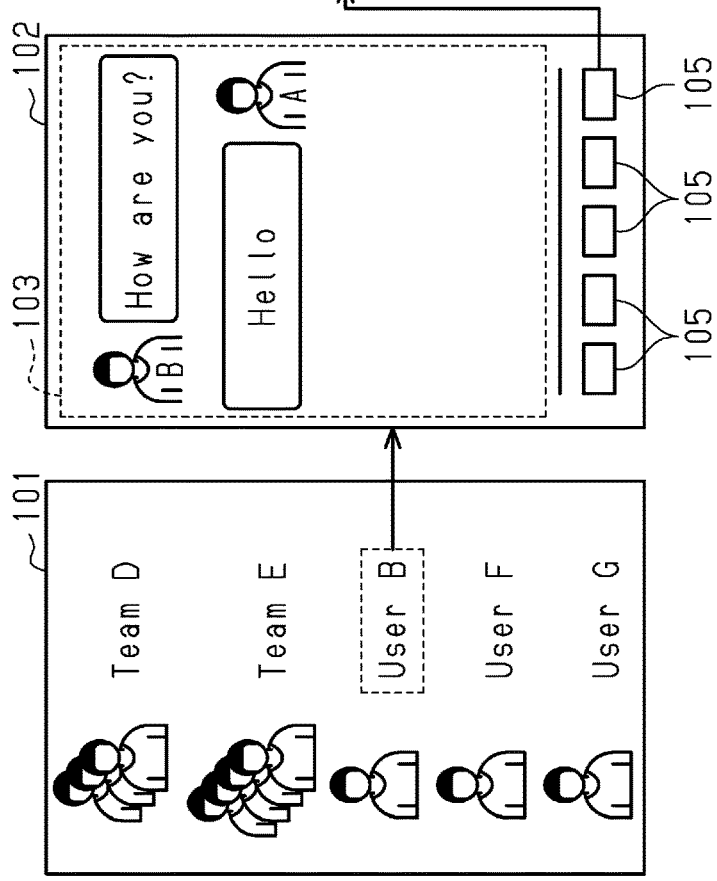

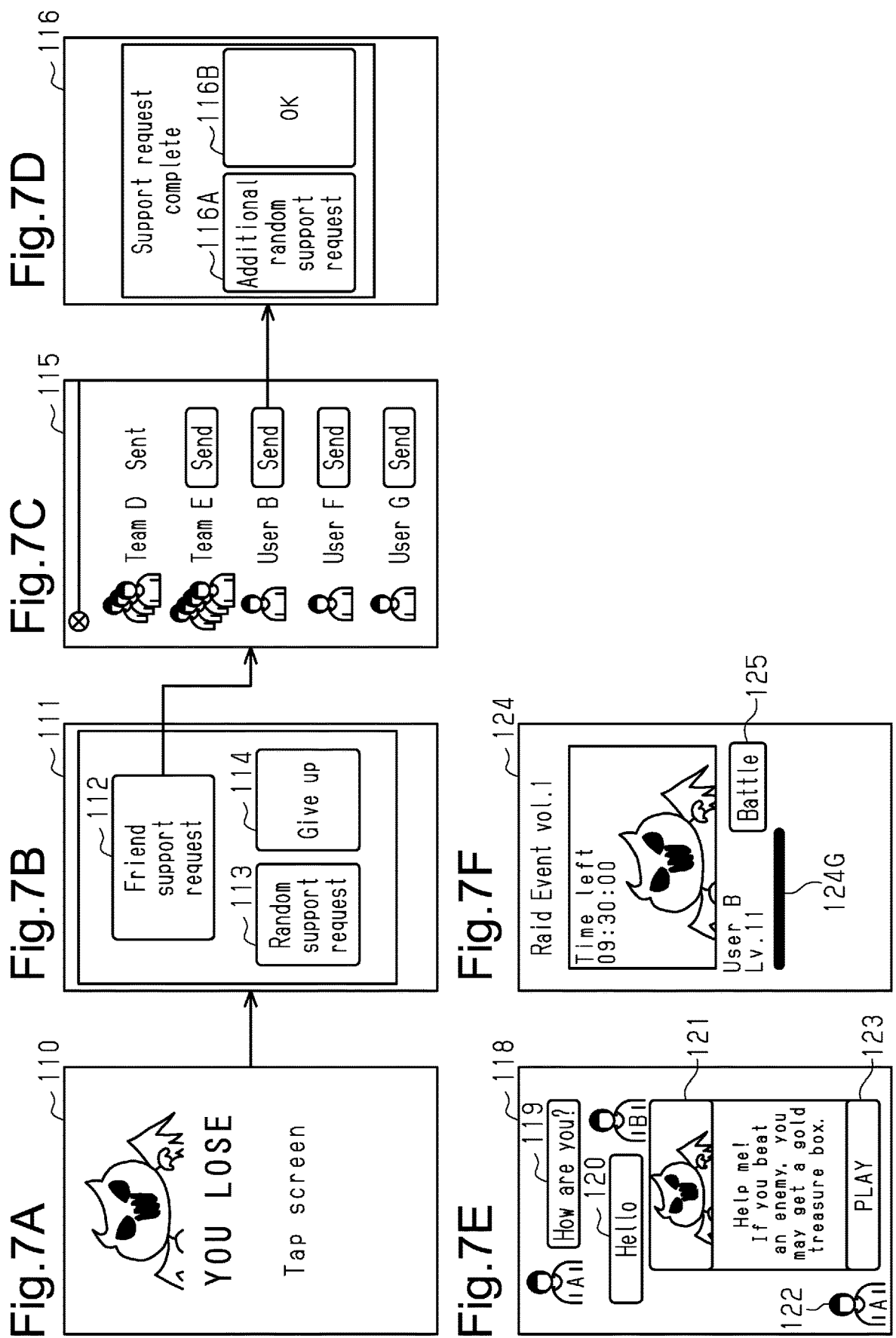

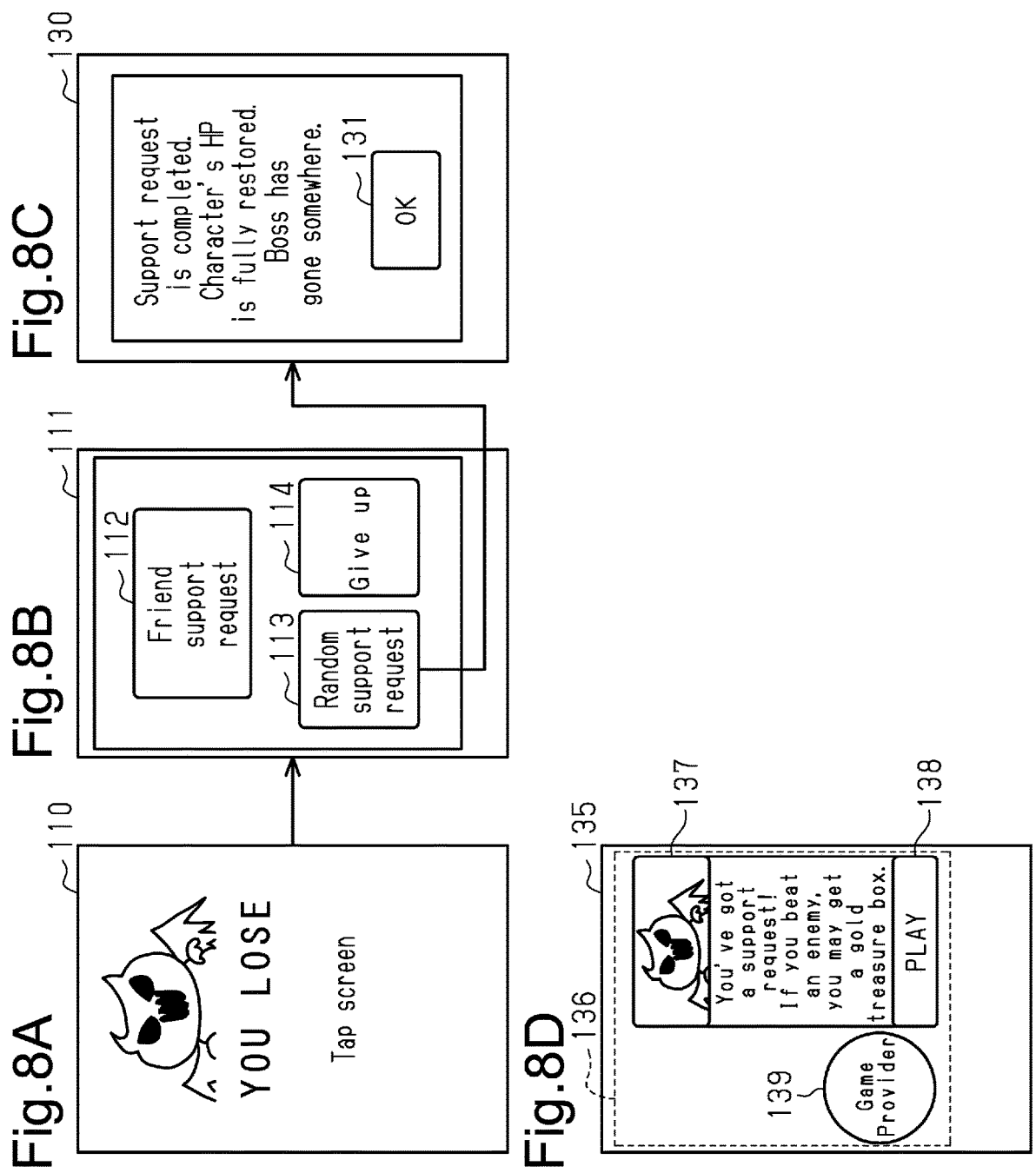

SYSTEM, METHOD, AND DEVICE FOR PROCESSING GAME

This application claims the benefit of priority from Japanese Patent Application No. 2018-163604 filed Aug. 31, 2018, the entire contents of the prior application being incorporated herein by reference.

BACKGROUND

1. Field

The following description relates to a system, a method, and a device for processing a game.

2. Description of Related Art

There is a known game in which a platform provided by a social networking service (SNS) is used. Such a game is generally referred to as a social game. In some social games, users playing the game can interact with each other.

Japanese Laid-Open Patent Publication No. 2013-128583 discloses a game in which a first user, who plays a social game, requests other users for help. A game server obtains friend information of the first user from an SNS server. An information terminal of the first user displays, on a display, a friend list obtained from the game server. When a particular user is selected from the friend list, the game server requests the SNS server to send a help request message to the selected user.

Whether the help request is accepted tends to depend on the number of friends on an SNS including real friends (friends in real world). For example, even if a user having many friends initially sends a help request to another user and the help request is not accepted, the user can continue to send help requests to other users until accepted. By contrast, a user having a small number of friends has a small number of users to which the user can send help requests. Thus, the probability of a help request being accepted tends to be relatively low.

SUMMARY

It is an objective of the present disclosure to provide a game that allows a user to enjoy himself/herself by gaining cooperation from other users regardless of human relationship in the real world.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a system for processing a game is provided. The system includes user terminals that include a first user terminal and a second user terminal, a first server, and a second server. The first user terminal includes circuitry configured to, during execution of a game, output, to a message application, a first message sending request for sending a message to the second user terminal while indicating a first user of the first user terminal as a sender, a second user of the second user terminal belonging to the same group as the first user or being approved by the first user, the message including identification information that allows one of the user terminals that has received the message to be forwarded to the game, and during the execution of the game, send, to the first server, a second message sending request for sending the message without specifying a recipient. The first server includes circuitry configured to, responsive to receiving the second message sending request, select a user specified as the recipient of the message, and send, to the second server, a third message sending request for sending the message while specifying the selected user as the recipient and indicating a game management account as the sender.

In another general aspect, a method for processing a game using a system including user terminals that include a first user terminal and a second user terminal, a first server, and a second server is provided. The first user terminal includes circuitry, and the first server includes circuitry. The method includes, by the circuitry of the first user terminal, selectively performing, during execution of a game, outputting, to a message application, a first message sending request for sending a message to the second user terminal while indicating a first user of the first user terminal as a sender, a second user of the second user terminal belonging to the same group as the first user or being approved by the first user, the message including identification information that allows one of the user terminals that has received the message to be forwarded to the game, and, during the execution of the game, sending, to the first server, a second message sending request for sending the message without specifying a recipient. The method also includes, by the circuitry of the first server, responsive to receiving the second message sending request, selecting a user specified as the recipient of the message, and by the circuitry of the first server, sending, to the second server, a third message sending request for sending the message while specifying the selected user as the recipient and indicating a game management account as the sender.

In a further general aspect, an information processor connected to one or more servers is provided. The information processor includes circuitry. The information processor is a first information processor. The circuitry is configured to, during execution of a game, output, to a message application, a first message sending request for sending a message to a second information processor while indicating a first user of the first information processor as a sender, a second user of the second information processor belonging to the same group as the first user or being approved by the first user, the message including identification information that allows one of the information processors that has received the message to be forwarded to the game, and, during the execution of the game, send, to a first server of the one or more information processors, a second message sending request for sending the message without specifying a recipient.

In a yet another general aspect, a method for processing a game by an information processor connected to one or more servers is provided. The information processor includes circuitry. The information processor is a first information processor. The method includes, by the circuitry, selectively performing, during execution of a game, outputting, to a message application, a first message sending request for sending a message to a second information processor while indicating a first user of the first information processor as a sender, a second user of the second information processor belonging to the same group as the first user or being approved by the first user, the message including identification information that allows one of the information processors that has received the message to be forwarded to the game, and, during the execution of the game, sending, to a first server of the one or more information processors, a second message sending request for sending the message without specifying a recipient.

Other features and aspects will be apparent from the following detailed description, the drawings, and the claims.

BRIEF DESCRIPTION OF THE DRAWINGS

FIGS. 6A to 6D are diagrams showing a view transition when a game is started.

FIGS. 7A to 7F are diagrams showing a view transition when a message is sent to a friend.

FIGS. 8A to 8D are diagrams showing a view transition when a message is sent randomly.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A system for processing a game according to an embodiment will now be described with reference to FIGS. 1 to 13.

Figure 1:
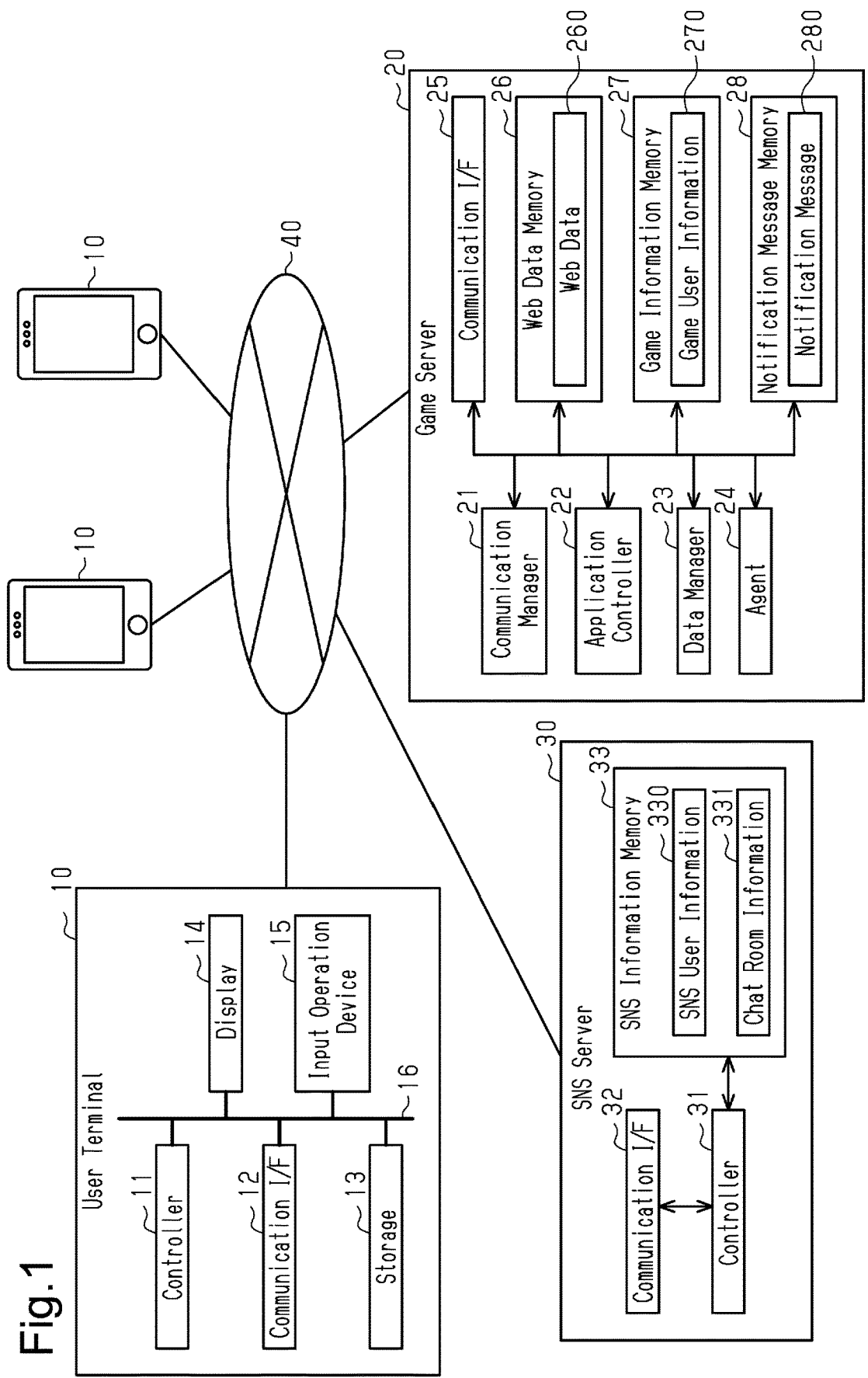
FIG. 1 is a schematic diagram showing a game system according to an embodiment.

As shown in FIG. 1, the system includes user terminals 10, which serve as information processors, a game server 20, which serves as a first server, and an SNS server 30, which serves as a second server. The user terminals 10, the game server 20, and the SNS server 30 are connected to each other in a communicable manner via a communication network 40.

The game server 20 uses the platform of an SNS provided by the SNS server 30 to provide a user with a game. The game server 20 may be configured by one server device or by multiple server devices. Alternatively, the game server 20 and the SNS server 30 may be configured by one server device.

The game server 20 will now be described. The game server 20 includes a communication manager 21, an application controller 22, a data manager 23, an agent 24, a communication interface (I/F) 25, a web data memory 26, a game information memory 27, and a notification message memory 28. The application controller 22 corresponds to a user selection unit, and the agent 24 corresponds to a sending request unit and a notification unit. At least one of the communication manager 21, the application controller 22, the data manager 23, the agent 24, and the like may be distributed to multiple servers. Further, at least one of the web data memory 26, the game information memory 27, and the notification message memory 28 may be incorporated in multiple servers.

The communication manager 21 controls communication with the user terminals 10 and the like. The communication manager 21 is not limited to one that performs software processing on all processes executed by itself. For example, the communication manager 21 may include a dedicated hardware circuit (for example, application specific integrated circuit: ASIC) that executes hardware processing on at least part of the processes executed by itself. That is, the communication manager 21 may be circuitry including one or more processors that operate according to a computer program (software), one or more dedicated hardware circuits that execute at least part of various processes, or a combination thereof. The processor includes a calculation processor such as CPU, MPU, or a GPU and includes a storage medium such as RAM or ROM. Further, the communication manager 21 includes a storage medium (memory), which is storage such as hard disk drive (HDD) or solid state drive (SSD). At least one of these storage media stores program codes or instructions configured to cause the CPU to execute processes. The storage media, or computer readable media, include any type of media that are accessible by general-purpose computers and dedicated computers. The application controller 22, the data manager 23, and the agent 24 have the same physical configurations as the communication manager 21. The hardware of the communication manager 21, the application controller 22, the data manager 23, and the agent 24 may be common to each other or independent from each other.

The web data memory 26 may be a storage medium such as HDD or SSD. The same applies to the game information memory 27 and the notification message memory 28. The web data memory 26, the game information memory 27, and the notification message memory 28 may have a common storage medium or may have independent storage media.

The communication manager 21 includes a Web server function. The communication manager 21 manages sessions with the user terminals 10 and the game server 20. For example, the communication manager 21 starts a session with a user terminal 10 by generating a session ID upon receipt of an access request in accordance with a HTTP protocol from the browser of the user terminal 10. The session ID is used to manage sending, reception, and the like of data as a history until one session ends, for example, until communication between the game server 20 and the user terminals 10 is ended or until the browser of the user terminal 10 is ended.

Further, the communication manager 21 causes at least one of the application controller 22, the data manager 23, and the agent 24 to execute a process corresponding to a request sent from the user terminal 10.

The application controller 22 creates web data using the information stored in each memory based on the request and the like sent from the user terminal 10.

The data manager 23 manages various types of information stored in the game information memory 27 and the like. For example, the information requested by the user terminal 10 is obtained from the game information memory 27 and the like. If necessary, the information is output to the application controller 22 and then sent to the user terminal 10 via the communication manager 21. Further, the data manager 23 updates or deletes various types of information stored in the game information memory 27 and the like in response to the request from the user terminal 10.

The agent 24 sends a message to an individual chat room for chatting with a user as an official account of the game. The official account of the game corresponds to a game management account. The agent 24 obtains, from the notification message memory 28, a message content corresponding to the type of a request sent from the user terminal 10 and the like. Next, the agent 24 outputs the obtained message content while specifying a sending destination. The sending destination to be specified is an individual chat room where a user playing an SNS game chats with the official account of the game. The communication manager 21 specifies a chat room to send the obtained message content to the SNS server 30. The agent 24 may automatically respond to a natural language message sent by the user. For example, the agent 24 may be artificial intelligence (AI) such as a chatbot.

The communication I/F 25 is a module for communicating with other communication devices via the communication network 40.

The web data memory 26 stores web data 260. The web data 260 includes a file described in markup language, image data embedded in the file, a JavaScript (registered trademark) program, and the like. The web data 260 may also include audio data. In markup language, elements are enclosed with tags. For example, markup language may be hypertext markup language (HTML), extensible markup language (XML), extensible hypertext markup language (XHTML), or other languages. Data described in markup language may be text data or binary data. As the data described in markup language, the web data 260 includes files created in sections such as game scenes, individual pages, or top views. Identification information for identifying a resource such as uniform resource locator (URL), uniform resource identifier (URI), and the like are set for such files.

The game information memory 27 stores game user information 270.

The game user information 270 is related to a game user. A game user refers to a user who uses an SNS provided by the SNS server 30 and plays a game provided by the game server 20 on the SNS. A game user refers to a user who is able to play a game. Instead, a game user may be a user who has accessed a game even once or may be a user who has registered registration information such as a user name to the game. The game user information 270 includes identification information of a user. Further, the game user information 270 may include at least one of the play history of a user, the number of times messages have been sent to other users, the number of times messages sent from other users have been received, a level in the game, and game media (game content) owned by the user, which are stored in association with the identification information of the user. Game media are electronic data used for the game and may be, for example, obtained, possessed, used, managed, exchanged, synthesized, reinforced, sold, abandoned, or donated by the user in the game. A game medium includes any medium such as a card, an item, a virtual currency, a ticket, a character, an avatar, level information, status information, parameter information (health value, attack force, and the like), competency, information skill, an ability, a spell, or a job. A game medium does not have to be used in the manner described in the specification.

In addition, the game user information 270 may store identification information of the friend user of the user in association with the identification information of the user. A friend user refers to another user who is approved by a user or who belongs to a group that includes the user. A group refers to, for example, a chat room. The user can search for a user who may be a friend on the SNS using an account or the like obtained by the user. Alternatively, the user can add another user to a group by inviting him or her to the group.

The application controller 22 requests for information related to a game user stored in the SNS server 30 in accordance with an application programming interface (API) or the like of the SNS server 30 at a predetermined timing. The SNS server 30 obtains the use status of an SNS by an SNS user and the play status of a game provided on the SNS and updates the information related to the SNS user based on the obtained information.

The application controller 22 receives game user information sent by the SNS server 30 and outputs it to the data manager 23. The data manager 23 stores the received game user information in the game information memory 27.

The notification message memory 28 stores a notification message 280. The notification message 280 is the template data of a message content to be sent to a user. The notification message 280 stores message contents for each type of a request received from the user terminal 10 or for each classification such as one or more keywords or the like.

The SNS server 30 will now be described. The SNS provided by the SNS server 30 in the present embodiment includes services of sending and receiving a message to and from user accounts and the like. In addition, the SNS server 30 or a server related to the SNS server 30 provides services of enabling at least a user to post information on an individual page set for the user. An individual page can be browsed by other users. For example, the individual page of each user may be able to be browsed from a view in which a message is browsed. The SNS server 30 is configured by one or more server devices. The SNS server 30 includes a controller 31, a communication interface (communication I/F) 32, and an SNS information memory 33.

The controller 31 is not limited to one that performs software processing on all processes executed by itself. For example, the controller 31 may include a dedicated hardware circuit (for example, application specific integrated circuit: ASIC) that executes hardware processing on at least part of the processes executed by itself. That is, the controller 31 may be circuitry including one or more processors that operate according to a computer program (software), one or more dedicated hardware circuits that execute at least part of various processes, or a combination thereof. The processor includes a calculation processor such as CPU, MPU, or a GPU and includes a storage medium such as RAM or ROM. Further, the SNS server 30 includes a storage medium (memory), which is storage such as HDD or SSD. At least one of these storage media stores program codes or instructions configured to cause the CPU to execute processes. The storage media, or computer readable media, include any type of media that are accessible by general-purpose computers and dedicated computers. The controller 31 receives a request sent from the user terminal 10 or a request sent from the agent 24 of the game server 20 and sends a message to a chat room specified as a sending destination. Additionally, the controller 31 may perform processes for achieving the function of a message application such as notification of the user terminal 10 about receipt of a message, recording and deletion of the message, and management of user information.

The communication I/F 32 is a module for communicating with other communication devices via the communication network 40.

The SNS information memory 33 is configured by one or more storage media. The SNS information memory 33 stores SNS user information 330 and chat room information 331. The SNS user information 330 includes identification information such as the account name of an SNS user. Further, the SNS user information 330 includes the use status of the game or the like provided on the SNS platform, which is stored in association with the identification information. Additionally, the SNS user information 330 may include the identification information of other users who are friends of the SNS user on the SNS.

The chat room information 331 is related to a chat room. When a user starts a game, an individual chat room is automatically created. In the individual chat room, the user chats with the official account (bot) of the game. Members of the chat room including users other than the official account are users who are friends with each other. For example, a chat room may be automatically created when a user approves another user as a friend. Alternatively, even when a user approves another user as a friend, a chat room does not have to be created unless the SNS server is instructed to create a chat room. As another option, when users are invited to an existing chat room, one or more of the users may be approved as friends. As an alternative, when users are invited to an existing chat room, the invited users may be set as friend users of all the members of the chat room. A chat room is created by at least one of the SNS server 30 and the game server 20.

The chat room information 331 includes a chat room ID, which is identification information of a chat room. In addition to the identification information of a user, which is part of a chat room, the chat room information 331 may include at least one of a message sending date/time, an icon image of the chat room, and a message content in the chat room.

The user terminal 10 will now be described. The user terminal 10 is a multi-functional mobile phone such as a smartphone. Further, the user terminal 10 simply needs to be a device that can display, on a display, an image based on the data received from the game server 20 or the SNS server 30. For example, the user terminal 10 may be a mobile phone (feature phone), a tablet terminal, a personal computer, or a game console.

The user terminal 10 includes, for example, one or more controllers 11, a communication (I/F) 12, a storage 13, a display 14, and an input operation device 15, which are connected to each other via a bus 16.

The controller 11 is not limited to one that performs software processing on all processes executed by itself. For example, the controller 11 may include a dedicated hardware circuit (for example, application specific integrated circuit: ASIC) that executes hardware processing on at least part of the processes executed by itself. That is, the controller 11 may be circuitry including one or more processors that operate according to a computer program (software), one or more dedicated hardware circuits that execute at least part of various processes, or a combination thereof. The processor includes a calculation processor such as CPU, MPU, or a GPU and includes a storage medium such as RAM or ROM. Further, the user terminal 10 includes a storage medium (memory), which is storage such as HDD or SSD. At least one of these storage media stores program codes or instructions configured to cause the CPU to execute processes. The storage media, or computer readable media, include any type of media that are accessible by general-purpose computers and dedicated computers. The ROM stores an operating system program and other programs. The controller corresponds to a first instruction unit, a second instruction unit, and a display controller.

The communication I/F 13 includes a communication circuit including a communication antenna. The communication I/F 13 accesses the communication network 40, which includes a base station or the like, and receives the data sent from the game server 20, the SNS server 30, and other server devices. Further, the communication I/F 13 sends the data to the game server 20, the SNS server 30, and other server devices.

The storage 13 is a storage medium such as HDD. The storage 13 may be incorporated in the housing of the user terminal 10 or may be an external storage medium connected to the user terminal 10. The storage 13 stores a message application program, other programs, and data. The message application program is downloaded and installed via the communication network 40 from a platform where the user terminal 10 provides various types of applications. Instead, the message application program may be installed by connecting a storage medium that stores the message application program to the user terminal 10.

The display 14 is an organic EL display or a liquid crystal display. The input operation device 15 is a pointing device such as a touch panel. The touch panel is combined with the display 14 to detect the operation position of a user and output a signal based on the operation position to the controller 11. In addition to or instead of the touch panel, the input operation device 15 may be an operation button, a touch pad, or a mouse provided in the housing of the user terminal 10.

Figure 2:
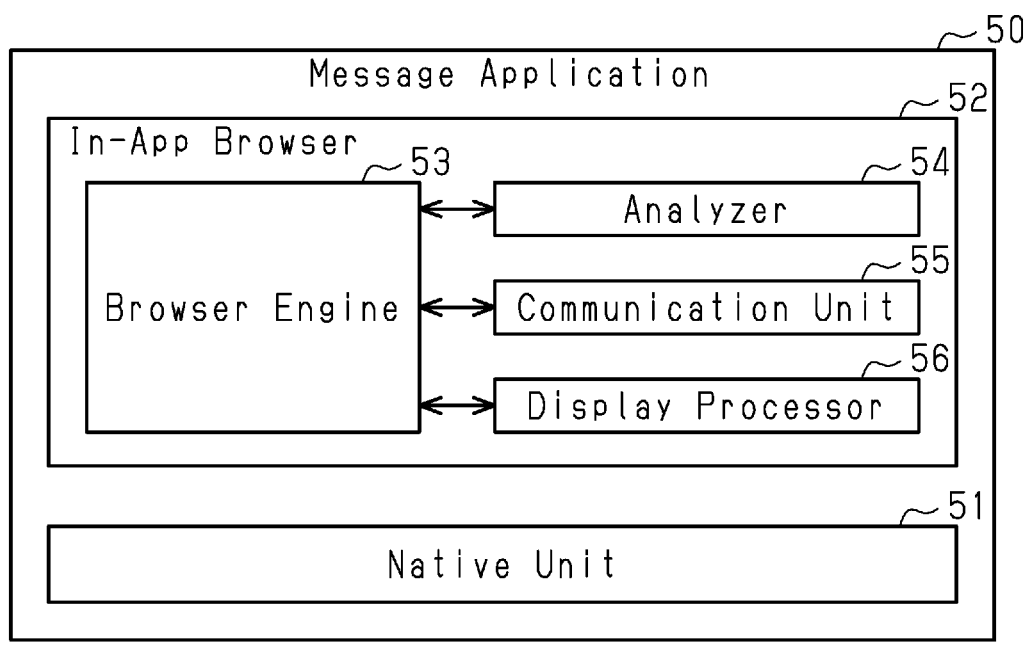
FIG. 2 is a schematic diagram showing a hybrid application that is partially implemented in a user terminal.

A message application 50 will now be described with reference to FIG. 2. The message application 50 collaborates with an SNS. The message application 50 is a hybrid application that can execute processes by a native application and processes by a web application. The message application 50 includes a native unit 51, which is implemented in the user terminal 10. The native unit 51 corresponds to a message sending unit of the message application 50. The native unit 51 corresponds to a message sending unit that sends and receives data to and from the SNS server 30. The native unit 51 can operate on an operating system (OS) of the user terminal 10 and access a resource that the web application is unable to access, for example, the storage 13 of the user terminal 10.

The native unit 51 sets, as a sending destination, a chat room specified by a user and sends, to the SNS server 30, a message that has been input via the input operation device 15. Further, the native unit 51 receives, from the SNS server 30, a message that has been sent to a chat room by another user and displays the message on the display 14. Additionally, the native unit 51 receives a message sent by the official account of the game to the chat room for the official account and a user and displays the message on the display 14.

In addition, even when the user is not logging in to the message application, the native unit 51 may display a push notification or the like on the display 14 of the user terminal 10 by receiving a receipt notification about a message from the SNS server 30.

The message application 50 includes an in-app browser 52. The in-app browser 52 achieves a browser function in the message application. The in-app browser 52 obtains web data from the game server 20 and displays, on the display 14, a game view based on the web data.

The in-app browser 52 includes a browser engine 53, an analyzer 54, a communication unit 55, and a display processor 56. The browser engine 53 requests the game server 20 or the like for web data corresponding to a specified URL. In addition, the browser engine 53 assigns processes to the analyzer 54, the communication unit 55, the display processor 56, and the like. For example, when the received web data is HTML data such as HTML5, the browser engine 53 causes the analyzer 54 to analyze HTML. If the received web data is image data such as JPEG, the browser engine 53 causes the display processor 56 to execute a display process.

The analyzer 54 analyzes HTML data and requests the game server 20 for necessary data based on the analysis result. For example, if cascading style sheets (CSS) data is necessary as a result of the analysis, the analyzer 54 requests the game server 20 for the CSS data. If image data is necessary, the analyzer 54 requests the game server 20 for image data.

In compliance with standards such as hyper transfer protocol (HTTP) or WebSockets, the communication unit 55 sends various types of requests to the game server 20 and receives the responses thereof. Further, the communication unit 55 receives various types of requests from the game server 20 and sends the responses thereof.

The display processor 56 converts the received image data into data for image display. The display processor 56 lays out the data in accordance with the size of the display 14, generates a drawing command, and outputs the image to the display 14.

The in-app browser 52 obtains the URL of the game when instructed to start the game with the user terminal 10 logging in to the message application 50. The game may be started by selecting a URL displayed in a predetermined chat room. The game may be started from any application. There may be multiple methods for starting the game. Further, the in-app browser 52 requests the game server 20 for web data 260 corresponding to the obtained URL. When obtaining the web data 260 from the game server 20, the in-app browser 52 displays, on the display 14, an image of the game based on the web data. When the input operation device 15 detects an operation on the view displayed on the display 14, the input operation device 15 requests the game server 20 for web data 260 corresponding to the operation.

Method for Sending Message to Another User

Figure 3:
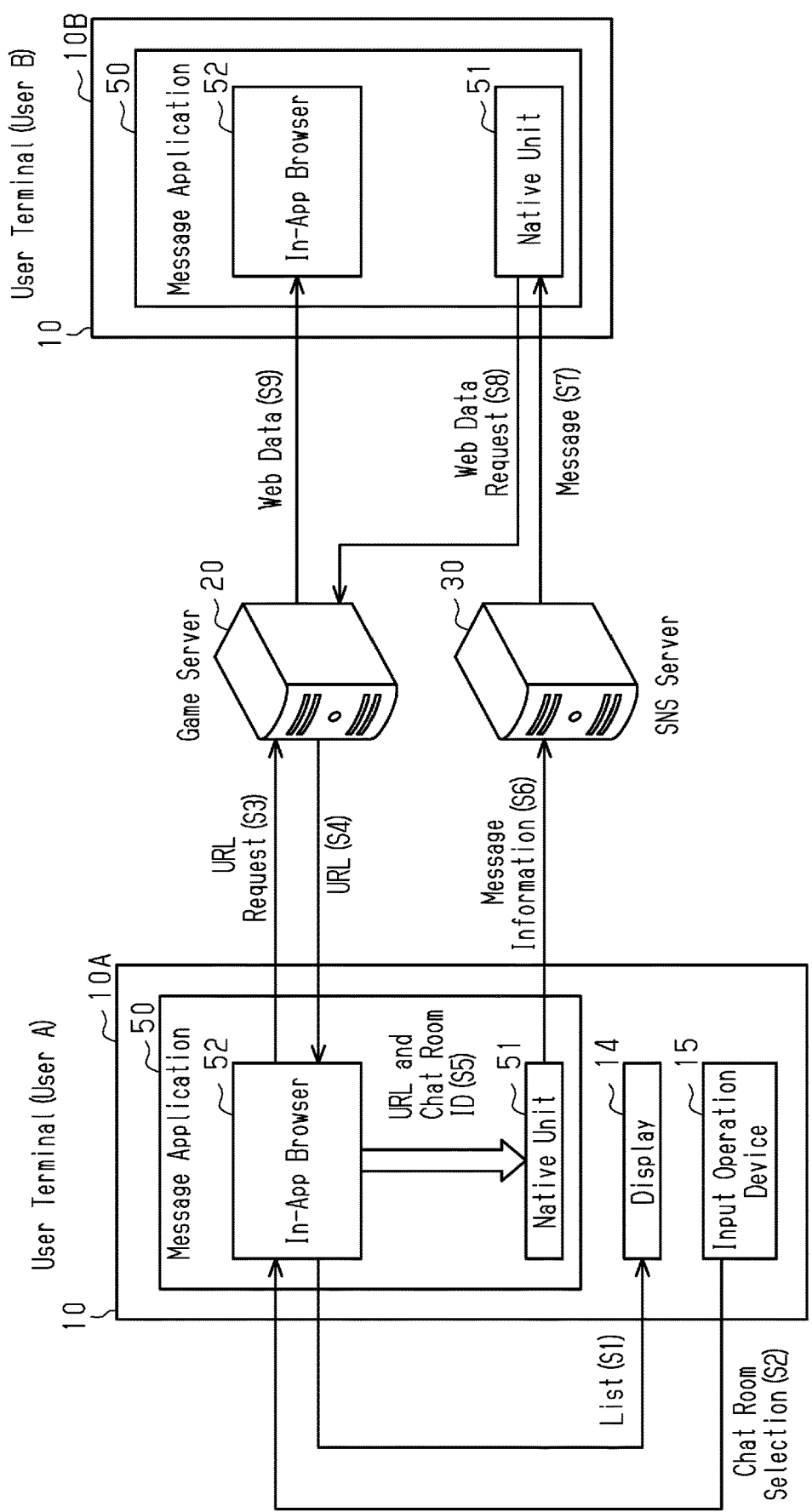
FIG. 3 is a diagram illustrating part of a procedure for a friend-to-friend sending method.

A method for sending a game-related message to a user using the function of the message application will now be described with reference to FIGS. 3 to 5. First, a method for sending a message to another user using the function of the message application during execution of a game will now be described with reference to FIGS. 3 and 4. The method for sending a message to another user includes a method by which a user specifies a user and sends a message and a method with which a user sends a message to another user without specifying a sending destination. The former one is referred to as a friend-to-friend sending method (first message sending), and the latter one is referred to as a random sending method (second message sending).

The friend-to-friend sending method will now be described with reference to FIG. 3. The description focuses on an example in which a user A, who is logging in to a game provided by the game server 20, sends a message to a user B, who is a member of the same chat room. User A and user B are users of the game provided by the game server 20. The terminal used by user A is a user terminal 10A, and the terminal used by user B is a user terminal 10B.

A process of the friend-to-friend sending method is started by the occurrence of a sending event of an image with user A logging in to (accessing) the game. A sending event simply needs to be related to the game, for example, a defeat in the game (for example, a defeat in a battle with a strong boss character), a win in the game or clearing of the game, an on-going status of the game or a parameter associated with user A being in a predetermined state, a game medium such as an item being obtained, a clearing method in the game being discovered, and user A selecting a predetermined icon. For example, it may be determined that a sending event has occurred when the user is defeated or is in a disadvantageous battle situation in a raid battle with one or more strong boss characters (raid bosses). When the user is defeated in the raid battle or is in a disadvantageous battle situation, the game progress can be advantageous if the user gains cooperation from another user, thereby motivating the user to continue the game. Especially, in the raid battle, the user battles with one or more extremely strong boss characters. The raid battle is set such that a single user cannot beat boss characters at one time. A user requests another user for support and cooperates with him or her to beat the boss characters. When a user requests another user for support, the number of users participating in the game increases rapidly. Thus, the game provider can expect activation of the game and sales increase of the game.

When detecting a sending event of a message, the in-app browser 52 of the user terminal 10A displays, on the display 14, a selection view for selecting the method for sending a message. When the sending of a message to a friend is selected on the selection view, the user terminal 10A displays, on the display 14 of the user terminal 10A, a list of chat rooms that include user A as a member (step S1).

User A operates the input operation device 15 to select a chat room for chatting with user B from the list of chat rooms displayed on the display 14 (step S2). The in-app browser 52 of the user terminal 10 sends a URL request to the game server 20 (step S3). The URL request is a message requesting generation of a URL for causing the in-app browser 52 of the user terminal 10B to display a game view.

When receiving the URL request, the game server 20 generates a URL to be sent to the user terminal 10B. Further, the game server 20 obtains a notification message 280 from the notification message memory 28. The game server 20 sends the generated URL and the notification message 280 to the user terminal 10A (step S4).

The in-app browser 52 of the user terminal 10A outputs, to the native unit 51 of the user terminal 10A, an ID of the chat room selected by user A and a URL received from the game server 20 together with the notification message 280 (step S5).

The native unit 51 sends, to the SNS server 30, message information including the chat room ID, the URL, and the notification message 280 (step S6). The notification message 280 may be stored in the storage 13 of the user terminal 10. In this case, when the chat room and the URL is obtained, the native unit 51 or the like may retrieve a corresponding message content from the storage 13.

When receiving the message information, the SNS server 30 sends a message to a chat room corresponding to the chat room ID included in the message information (step S7). The message includes a URL and a message content that is based on the notification message 280. In step S2, for example, when a message is sent to a chat room including three members or more, the message is sent to the user terminal 10 of each member. In the user terminal 10B, when a push notification by the message application is allowed, a push notification notifying that a message has been received may be displayed on the display 14 of the user terminal 10B.

In accordance with an operation of user B, the user terminal 10B logs in to the message application and displays, on the display 14, a message sent from user A. The message is displayed as a message sent from user A in a chat room that includes at least user A and user B as members. The URL generated by the game server 20 is displayed in a selectable manner together with the message. Alternatively, the URL is embedded in an object that displays the message or an object displayed in association with the message, or is displayed near a message object.

Instead, when the user terminal 10B is not logging in to the message application, the message may be displayed as a push notification on the display 14. As another option, the message may be displayed as an email sent to the mail application of the user terminal 10 via the SNS server 30.

When a URL is selected by an operation of user B, the in-app browser 52 of the message application of the user terminal 10B requests the game server 20 for the web data 260 of the selected URL (step S8).

In response to the request from the user terminal 10B, the game server 20 sends the web data 260 of a specified URL to the user terminal 10B (step S9). The in-app browser 52 of the user terminal 10B displays, on the display 14, a view that is based on the received web data 260.

In this manner, when a message is sent using the friend-to-friend sending method, the sender and the recipient are in a friend relationship on the message application. Thus, user B can respond to a message easily. Further, using the message application, user A can immediately share the play status of the game with friend users. This activates game-related communication between game users, thereby increasing the number of users accessing the game.

The random sending method will now be described with reference to FIG. 4. The description focuses on an example in which user A sends a message to a user C via the official account of a game. User C is not a friend user of user A and does not share a chat room with user A. User A and user C are users of a game provided by the game server 20. The terminal used by user A is the user terminal 10A, and the terminal used by user C is a user terminal 10C.

When detecting a sending event of a message, the in-app browser 52 of the user terminal 10A displays, on the display 14, a selection view for selecting a method for sending a message. When the random sending method is selected on the selection view, the user terminal 10A sends a message sending request to the game server 20 (step S11).

When receiving the message sending request, the game server 20 requests for the information of a game user, who is an SNS user using the game, in accordance with the API of the SNS (step S12). The condition of the game user requesting for the information is preferably to be logging in to the message application and to have used the game. Instead of or in addition to this condition, the condition may be that the use status of the message application or the game and parameters in the game are at least in a predetermined state. The game server 20 requests for information related to SNS users other than friend users of user A.

When receiving the request for the game user information, the SNS server 30 retrieves the information of the game user satisfying the above-described condition and sends the information to the game server 20 (step S13). The information of the game user includes chat room IDs of the user satisfying the above-described condition and the official account of the game. The request for the information of the game user (step S12) and the sending of the information of the game user (step S13) do not have to be performed when the random sending method is selected and may be performed in a predetermined time interval.

The game server 20 receives the information of the game user sent by the SNS server 30 and stores the information in the game information memory 27. When the received game user information includes information related to multiple game users, the game server 20 selects a predetermined number of game users. For example, the condition for selection is to have a degree of activity that has a certain value or higher or is in a certain range in the game or the message application and to have a level that is approximately the same as the level of user A. A degree of activity is a degree determined depending on the activity status of a user such as the frequency of playing the game, the number of times a message has been posted, and the frequency of logging in to the message application or the game. The condition for selection may be that one of the degree of activity or the level has a certain value or higher or is in a certain range. Further, for example, the selection condition may be that a predetermined game medium is owned, the play history is highly similar to the play history of the user who sent a message, or the play history is in a predetermined relative relationship with the play history of the user who sent a message. The relative relationship is to have, for example, a higher (or lower) level than user A, a higher (lower) play frequency than user A, or the like. It is assumed that the game server 20 selects user C. The above-described selection condition may be changed at a predetermined timing. The selected user may be stored in a list in the game information memory 27. This list stores the users of sending destinations in the random sending method in the past. In addition to the identification information of users, the list may store the attribute information of the users in the game (a parameter or a game medium, which serves as an object).

Prior to, subsequent to, or in parallel with obtaining game user information, the application controller 22 of the game server 20 generates a URL for the user terminal 10C to be forwarded to. The agent 24 of the game server 20 obtains, from the notification message memory 28, the notification message 280 corresponding to the random sending method. The agent 24 generates message information including the ID of the chat room for user C and the game official account, the generated URL, and the notification message 280. The agent 24 sends the message information to the SNS server 30 (step S14).

When receiving the message information, the SNS server 30 obtains the chat ID included in the message information. Then, the SNS server 30 sends a message including the URL to the chat room for user C and the game official account (step S15). In the user terminal 10C, when a push notification by the message application is allowed, a push notification for notifying about the reception of a message may be displayed on the display 14 of the user terminal 10C.

In accordance with an operation of user C, the user terminal 10C logs in to the message application and displays, on the display 14, the message sent from user A. The message is displayed as a message sent from the game official account in the chat room for user C and the official account. The information related to user A is not displayed. The URL generated by the game server 20 is embedded in the message. Alternatively, the URL is embedded in an object displayed in association with the message or displayed near the message.

Instead, when the user terminal 10C is not logging in to the message application, the message may be displayed as a push notification on the display 14. As another option, the message may be displayed as an email sent to the mail application of the user terminal 10 via the SNS server 30.

When a URL is selected by an operation of user C, the in-app browser 52 of the message application of the user terminal 10C requests the game server 20 for the web data 260 of the selected URL (step S16). In response to receiving the request for the web data 260 from user C, the game server 20 may reflect the fact that user C has responded to the message on the list stored in the game information memory 27. When the random sending method is specified from any user, the game server 20 may use the list to select the user of the sending destination. The game server 20 may select a user having a high response rate or a large number of responses more frequently than a user having a low response rate or a small number of responses.

In response to the request from the user terminal 10C, the game server 20 sends the web data 260 of the specified URL to the user terminal 10C (step S17). The in-app browser 52 of the user terminal 10C displays, on the display 14, a view that is based on the received web data 260.

Thus, in the random sending method, when the number of friend users of user A, who serves as a sender, is small, when another user cannot respond to the message of user A, and the like, a message can be sent to a different user, who is not in a friend relationship. This increases the number of users who access the game. Further, when the user sends a message to another user who is not in a friend relationship, the other user may browse the individual page of the user who sent the message. For example, when user A directly sends a message to user C, user C shares a chat room with user A, allowing user C to transit to the individual page of user A and browse posted messages on the timeline of user A. Thus, the private information or the like disclosed on the SNS of a user who sent the message may be unintentionally browsed by a user who received the message. The message sent using the random sending method is sent while setting the game official account as a sender. The information related to user C, who serves as a recipient, is not displayed in the user terminal 10A, and the information related to user A, who serves as a sender, is not displayed in the user terminal 10C. Thus, user C does not browse the private information displayed on the individual page of user A resulting from the sending and receiving of a message, and vice versa. Further, user C is prevented from sending, to user A, a message input using the message application, and vice versa. This reduces unintentional connections on an SNS while allowing game users who are not in a friend relationship in the real world to send and receive messages. Thus, the psychological barriers for sending a support request to unknown users are reduced, thereby activating the game.

Figure 4:
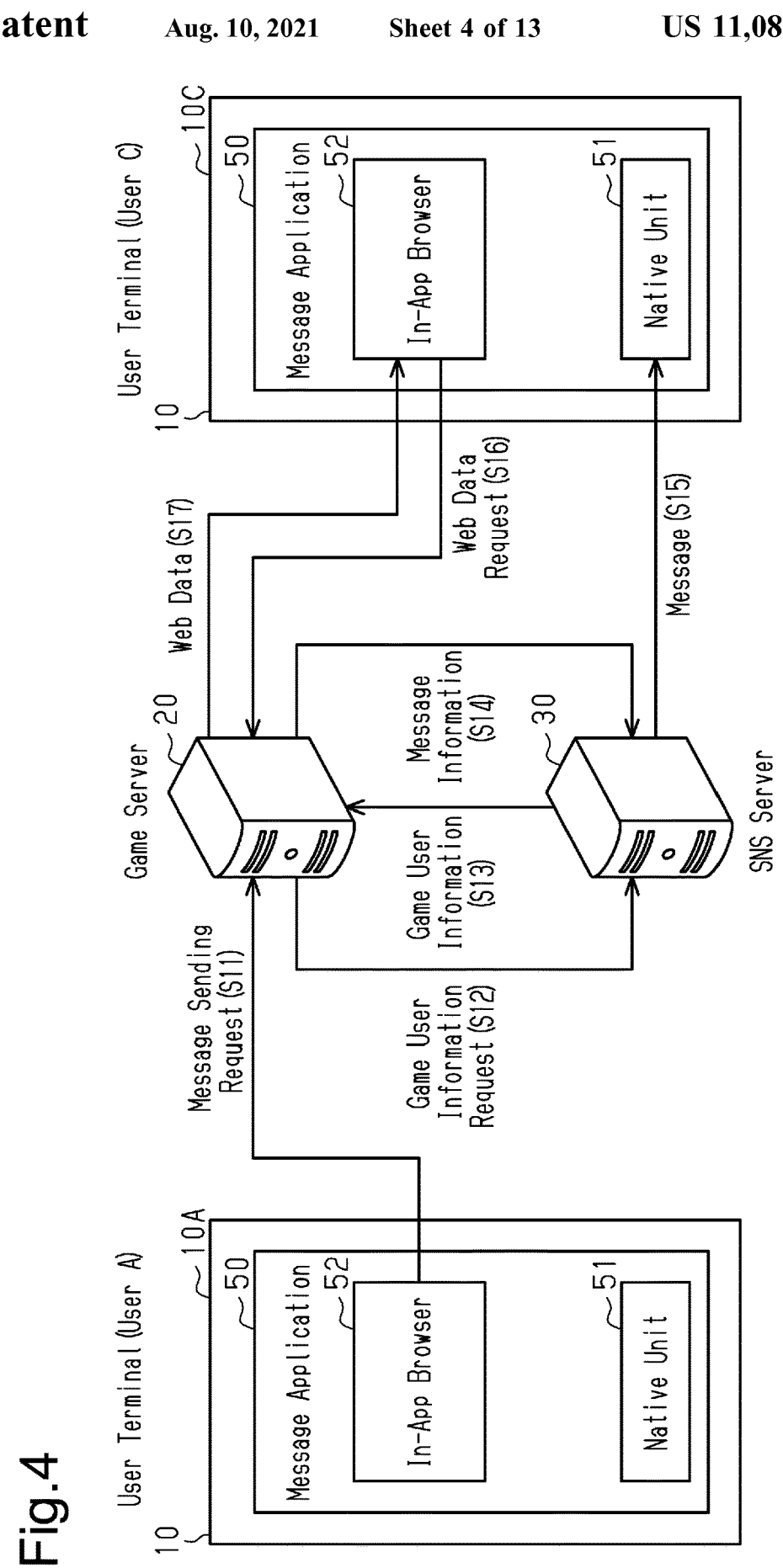
FIG. 4 is a diagram illustrating part of a procedure for a random sending method.
Figure 5:
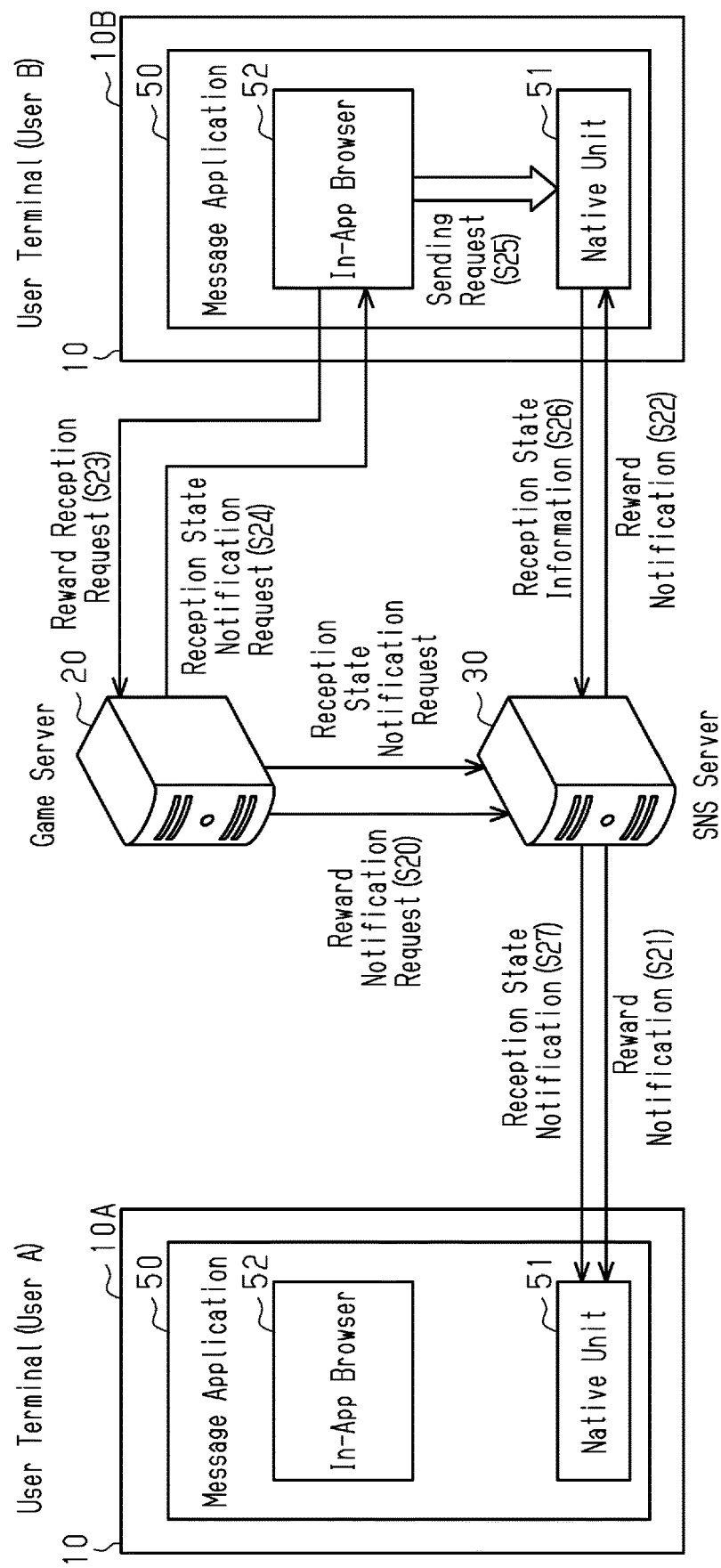
FIG. 5 is a diagram illustrating a procedure for receiving a reward.

In the example of FIG. 4, in the random sending method, a message is sent to user C, who is not a friend, via the official account from user A. Instead, in the random sending method, the sending destination of a message may be selected from a user group including friend users of user A. The random sending method simply needs to be performed such that at least a user serving as a sender is not notified of the sending destination of a message and a user serving as a recipient is not notified of the sender.

Notification about Situation of Another User Related to Notification Target Event A method for notifying a user of the situation of a notification event of another user when a notification target event occurs will now be described with reference to FIG. 5. The description focuses on an example in which user A cooperates with user B, who is in a friend relationship, to execute an event held in the game. After completion of the event, the game server 20 associates user A and user B with rewards for the completion of the event in a receivable state.

The agent 24 of the game server 20 sends a reward notification request to the SNS server 30 while setting the chat room for user A and the game official account and the chat room for user B and the game official account as sending destinations (step S20). A reward notification is to notify that a reward can be received.

When receiving the reward notification request, the SNS server 30 sends the reward notification while setting the chat room for user A and the game official account as a sending destination (step S21). Further, the SNS server 30 sends the reward notification while setting the chat room for user B and the game official account as a sending destination (step S22).

Based on an operation of user A, the user terminal 10A displays the reward notification in the chat room for chatting with the official account of the message application. Based on an operation of user B, the user terminal 10B displays the reward notification in the chat room for chatting with the official account of the message application.

It is assumed that user B performs an operation for receiving a reward using the user terminal 10B at a timing earlier than user A. The user terminal 10B accepts the operation for receiving a reward and sends a reward reception request to the game server 20 (step S23). The game server 20 stores the reward associated with user B in the game user information 270, with the reward owned by user B.

When assigning the reward to user B, the game server 20 sends a request for a reception state notification to the user terminal 10B while setting the chat room for user A and user B as a sending destination (step S24). The reception state notification is to notify user A that user B has received the reward while setting user B as a sender in a case in which user B has received the reward. The game server 20 obtains a notification message 280 corresponding to the reception state notification from the notification message memory 28. The game server 20 incorporates, into the notification request for the reception state, the ID of the chat room for user A and user B and a message content that is based on the notification message 280. Further, the game server 20 may incorporate, into the notification request for the reception state, a URL for forwarding the user terminal to a reward assignment view.

When receiving the notification request for the reception state, the in-app browser 52 of the user terminal 10B outputs, to the native unit 51, a sending request for the reception state notification including, for example, a chat room ID and a message content (step S25). The native unit 51, which has received the sending request, sends the reception state information including, for example, a chat room ID and a message content, to the SNS server 30 while setting user B as a sender (step S26). The notification request for the reception state may be sent from the game server 20 to the SNS server 30 without the user terminal 10.

When receiving the reception state information, the SNS server 30 sends the reception state notification to the chat room for user A and user B corresponding to the chat room ID (step S27). The user terminal 10A displays the reception state notification in the chat room for user A and user B. In the reception state notification, user B is displayed as a sender. This prompts user A to receive the reward.

View Transition of Game

A transition that occurs in a view of a game displayed on the display 14 of the user terminal 10 and a view in which a message is sent from the game will now be described with reference to FIGS. 6A to 6D and FIGS. 10A to 10F.

FIGS. 6A to 6D show examples of views displayed when the game is started from the message application. The game can be selected from the view of the chat room of the message application. As shown in FIG. 6A, the controller 11 of the user terminal 10A displays a list 101 of the chat room on the display 14 based on an instruction from the input operation device 15 given by user A. User A selects a chat room from the list 101. The controller 11 displays the view of the selected chat room on the display 14.

FIG. 6B shows an example of a chat room view 102 for chatting with user B. The chat room view 102 displays a timeline 103 and menu icons 105. The timeline 103 chronologically displays a message sent from user A and a message sent from user B. The menu icons 105 include, for example, a home icon for returning to the home view of user A and a game icon for selecting a game. When the menu icon 105 for selecting a game is selected, the game list is displayed, and one game is selected from the game list by an operation of user A. When the game is selected, the controller 11 requests the game server 20, which provides the selected game, for web data 260. The in-app browser 52 of the user terminal 10A, which has received the web data 260, displays a game view based on the web data on the display 14.

FIG. 6C shows an example of a top view 106 of the selected game. The top view 106 displays a menu button and an event select button 107. For example, when the event select button 107 is selected, an event view is displayed.

FIG. 6D shows an example of an event view 108. For example, the event view 108 displays multiple events that can be selected by user A. For example, the event view may display the value of a parameter related to user A or a boss character, who serves as an enemy, and display a gauge 108G, which indicates the parameter. When a select button 109 for a raid battle with, for example, a raid boss (boss character) is selected from the multiple events, a raid battle starts. The view may display the progress status of the game by the user as the gauge 108G or other image objects. The view may display, for example, information indicating a battle situation of a raid battle such as an amount in which parameters such as HP of the raid battle is depleted, a reward assigned when a user requests another user for support, or a reward assigned when a user wins against a boss by requesting for support.

A view displayed when a user sends a message from the game to another user using the function of the message application and a view displayed on another user terminal 10 receiving the message will now be described with reference to FIGS. 7A to 7F and FIGS. 8A to 8D. The description focuses on an example of the friend-to-friend message sending method for requesting user B, who is a friend, for support to beat a raid boss when user A is beaten in the raid battle and the random sending method for requesting user C, who is not a friend, for support via the official account.

FIG. 7A shows a game result view 110 displayed after user A is defeated in the raid battle. In the example of FIG. 7A, the defeat in the raid battle is a sending event for sending a message. The view transitions to a support request selection view, for example, when a predetermined time elapses after the game result view 110 is displayed or when the game result view 110 is tapped.

FIG. 7B shows an example of a support request selection view 111.

The support request selection view 111 displays a select button 112 for a friend support request, a select button 113 for a random support request, and a select button 114 for not issuing a support request. When the select button 114 is displayed, the raid battle ends in a defeated state. A friend support request is to issue a support request for a user who is a friend on the message application. When the select button 114, with which a support request is not issued, is selected, a support request is not issued and the view returns to the game.

FIG. 7C shows an example of a chat room selection view 115, which is displayed when the select button 112 is selected. The chat room selection view 115 displays a list of chat rooms to which user A belongs. The members included in these chat rooms are friend users of user A. When user A selects one chat room from the list, the user terminal 10A sends a URL generation request to the game server 20. User A may be able to select multiple chat rooms.

FIG. 7D shows an example of a sending complete view 116, which is displayed on the display 14 of the user terminal 10A. The sending complete view 116 displays a select button 116A for successively issuing a random support request and a select button 116B for ending a support request. When the select button 116B is selected, the controller 11 of the user terminal 10A ends the raid battle, thereby returning to a predetermined stage of the game or a predetermined view such as the top view. When the support request is complete in this manner, the game server 20 restores a parameter that is associated with user A and reduced in the raid battle. For example, the game server 20 offsets the reduction amount of HP of user A and restores it to the maximum value. When the select button 116A is selected, the controller 11 performs a process for issuing the random support request subsequent to the friend support request.

FIG. 7E shows an example of a chat room view 118, which is displayed on the display 14 of the user terminal 10B, which is used by user B, to which the support request has been sent. The chat room view 118 includes a timeline that chronologically displays a message 119, which has been sent by user A, and a message 120, which has been sent by user B. When user A selects the chat room for user B in the chat room selection view 115 of FIG. 7C, a support request message 121 is displayed in the chat room view 118. That is, when user A requests user B for support, the support request message 121 is automatically sent to user B without user A's operation. The support request message 121 is displayed as an object of a message sent by user A. More specifically, the support request message 121 is displayed in association with an icon 122, from which user A is identified. The support request message 121 displays a support selection part 123 and a message content that prompts the user to transition to the raid battle of the game. A URL for forwarding the user terminal to the raid battle where user A has been defeated is embedded in the support selection part 123. When user B selects the support selection part 123, the user terminal 10B directly transitions to the view of the raid battle.

When the support selection part 123 is selected, the controller 11 of the user terminal 10B requests the game server 20 for web data 260 of the URL associated with the support selection part 123. The game server 20 performs a login process as necessary to cause user B to log in and sends the requested web data 260 to the user terminal 10B. The controller 11 of the user terminal 10B displays the view of the raid battle based on the received web data 260.

FIG. 7F shows an example of a raid battle view 124, which is displayed in the user terminal 10B. The raid battle view 124 may display the value of a parameter of user B or the boss character and display a gauge 124G, which indicates the parameter. For example, when a select button 125 for selecting user B is selected, the raid battle can be started. Based on the request from the user terminal 10B, the game server 20 causes the raid battle to progress using some or all of game mediums such parameters, characters, and items associated with user B.

Thus, the friend support request is sent to a chat room in which only friend users are members, for example, the chat room for user A and user B. A user serving as a recipient tends to have a sense of affinity for friend users rather than the official account. Accordingly, it is expected that the user easily responds to a support request when the support request is sent to a chat room in which only friend users are members.

A view displayed when the random support request is issued will now be described with reference to FIGS. 8A to 8D. As shown in FIG. 8A, when user A is defeated in the raid battle, the display 14 of the user terminal 10A displays the game result view 110 in the same manner as the friend support request.

FIG. 8B shows the support request selection view 111. In this view, the random support request issued by user A is complete when the select button 113, which shows a random support request or the like, is selected. Characteristics related to a user who sends the random support request may be able to be selected. The user-related characteristics are, for example, the level of a user subject to support request, the date/time at which the user last logged in, whether the user is logging in, and whether to prioritize a user who supported previously. The information from which the user can be identified is excluded. When the random support request is issued, the number of people who request for support may be determined. The random support request may be sent to a single user or be automatically sent to a predetermined number of people.

FIG. 8C shows an example of a complete view 130. The complete view 130 displays a message indicating the support request is complete and a complete confirmation button 131. No notification is issued about the user serving as the sending destination of the random support request. When the complete confirmation button 131 of the complete view 130 is selected, the view transitions to the game view.

When the random support request by user A is complete, the game server 20 selects user C, to which the random support request is sent. Then, the SNS server 30 sends a random support request message to the chat room for user C and the game official account. In addition, a notification that a random support request message has been sent to another user may be issued in the chat room for user A and the game official account.

FIG. 8D shows an example of a chat room view 135 of the chat room of user C and the game official account. The chat room view 135 is displayed on the display 14 of the user terminal 10C, which is used by user C. The chat room view 135 displays a timeline 136, which displays, for example, holding of an event, addition of a new game medium, and various types of notifications from the official account. A support request message 137, which is sent from the official account, is displayed as a message object on the timeline 136. The support request message 137 displays the official account as a sender and does not display user A, who has asked for the support request. For example, the support request message 137 is displayed in association with an icon 139 of the official account. The support request message 137 displays a support selection part 138 and a message content that prompts the user to transit to the raid battle of the game. A URL for the raid battle where user A was defeated is embedded in the support selection part 138.

When the support selection part 138 is selected, the in-app browser 52 of the user terminal 10C requests the game server 20 for web data 260 corresponding to the URL embedded in the support selection part 138. When receiving the web data 260 from the game server 20, the controller 11 of the user terminal 10B displays, on the display 14, a view that is based on the web data 260.

Figure 9:
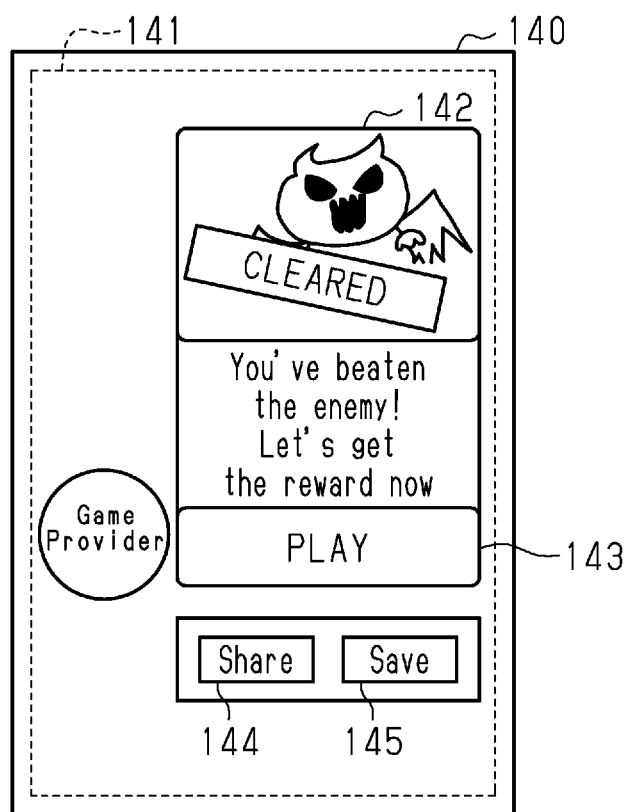
FIG. 9 is a diagram showing a view after completion of the game.
Figure 10:
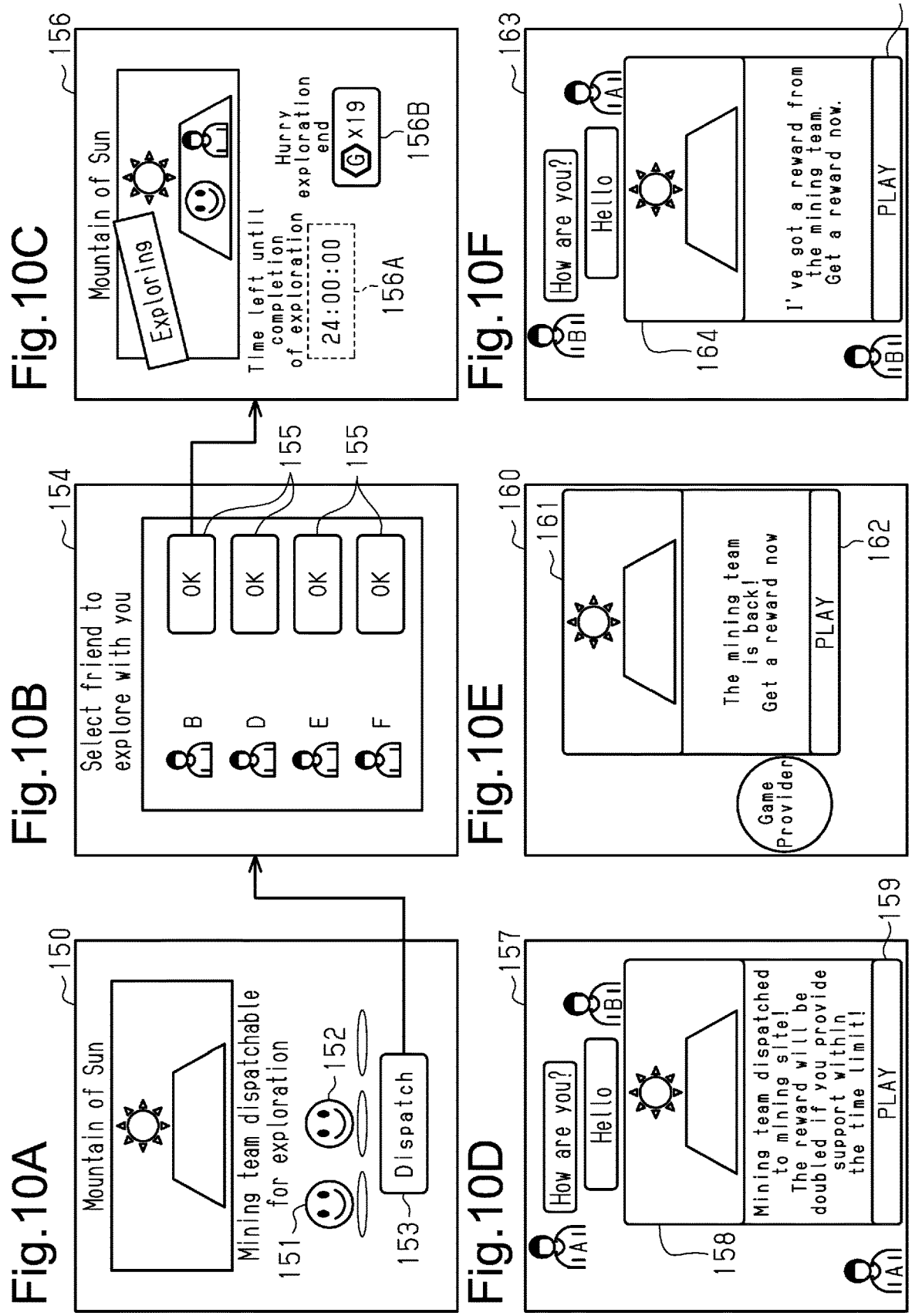
FIGS. 10A to 10F are diagrams showing a view transition when a reward is received.

FIG. 9 shows a chat room view 140, which is displayed when a user who has received a support request wins against a raid boss in a raid battle both in the friend support request and the random support request. For example, a reward is assigned to user B or user C when a reward assigning condition, in which user B or user C wins against a raid battle in which user A has requested for support, is satisfied. In addition to the user who has received a support request, a reward may also be assigned to a user who has sent the support request.

The chat room view 140 is a view of a chat room for a user and the game official account. The chat room view 140 displays a timeline 141, which displays a result notification 142. The result notification 142 includes a selection part 143. When the selection part 143 is selected, the view transitions to, for example, a reward reception view or a top view. Further, the timeline 141 may display a share button 144 for sharing a message with other users, a save button 145, and the like in association with the result notification 142. The share button 144 and the save button 145 may be displayed by performing a predetermined operation on the view. When the share button 144 is selected, a message from a chat room for a user and the official account can be shared with (transferred to) other users. In addition to the result notification 142, a secondary process for a message such as sharing and saving of a message may also be performed for other messages shown in the timeline.

A view for notifying a user of the situations of other users when a notification target event occurs will now be described with reference to FIGS. 10A to 10F. The description focuses on a case in which user A cooperates with user B, who is in a friend relationship, to execute an event of going mining at a mining site, which is set by the game. When a certain period time passes after dispatch of a mining team, rewards are assigned to user A and user B, who have cooperated to complete the event.

FIG. 10A shows an example of an event start view 150. The event start view 150 displays characters 151 and 152, who are owned by user A, as a mining team. The mining team may be a character selected by the user or a character selected by the game server 20 from the characters owned by the user. The number of characters forming a mining team may increase every time the level of the user reaches a particular level. If a game character of a friend user is not added, the user cannot participate in the event of exploring the mining site. In the example of FIG. 10A, the number of characters forming the mining team is three, and two characters owned by user A have been added to the mining team. Thus, a character of a friend user needs to be added to the team as the remaining one of the mining team. To participate in the event, user A selects a start button 153 for the event start view 150.

FIG. 10B shows an example view of a list view 154 of friends subject to the request for cooperation. User A performs an operation of selecting one user from the friend users displayed on the list view 154. For example, user A selects a select button 155, which is displayed in correspondence with each friend user. In this example, it is assumed that user B is selected. When the friend user is selected, the game server 20 selects one of the characters owned by user B to create a mining team. Further, the display 14 of the user terminal 10A displays a screen indicating that the dispatch is complete. In a game in which user B plays the game as a player, when a character owned by user B is added to the mining team of user A, the setting may be made such that the character does not appear. Instead, the setting may be made such that the game can be played using the character. Alternatively, when a character is added to the mining team, the setting may be made for only user A such that the character does not appear in a different scene (such as battle) in the game. As another option, the setting may be made for only user B or both user A and user B such that characters dispatched to the mining team do not appear in a different scene in the game.

FIG. 10C shows an example of a dispatch complete view 156. When the friend user is selected on the list view 154 of FIG. 10B to complete the dispatch, the time elapsed from the point in time of the completion is measured. The dispatch complete view 156 displays a remaining time 156A, which is from completion of the exploration to returning of the mining team. The dispatch complete view 156 also displays a selection part 156B, which is used to shorten the remaining time. When the selection part 156B is selected, the game server 20 shortens the remaining time by reducing a parameter associated with user A or subtracting a game medium (for example, gem) displayed as an object in the game.

FIG. 10D shows an example of a chat room view 157 for user A and user B after completion of the dispatch. When user A confirms a user requested by user A for cooperation as user B, the chat room view 157 for user A and user B displays a dispatch notification message 158. That is, when user A requests user B for cooperation, the dispatch notification message 158 is automatically sent to user B without user A's operation. The dispatch notification message 158 includes a selection part 159 and a message saying, for example, "the reward will be doubled if you provide support within the time limit." The dispatch notification message 158 is displayed in association with user A, who serves as a sender. When the selection part 159 is selected by user B, the view transitions to a game view. In the transitioned game view, when a yell button or the like is selected, support is made for the mining team. When accepting the support for the mining team, for example, the game server 20 increases the reward that is to be assigned to user B.

When a certain period of time from the dispatch to the returning of the mining team elapses, the agent 24 of the game server 20 sends a reward notification to the chat room for user A and the game official account. Further, the agent 24 of the game server 20 displays a reward notification in the chat room for user B and the game official account.

FIG. 10E shows an example of a chat room view 160 for a user and the game official account. The chat room view 160 for a user and the game official account displays a reward notification 161. The reward notification 161 is displayed while setting the game official account as a sender. The reward notification 161 includes a message content notifying that the reward has been assigned and a selection part 162 for forwarding the user terminal 10 to the game. When the selection part 162 is selected by an operation of the user, the user terminal 10 is forwarded to the game and the view transitions to, for example, a reward reception view or a top view of the game. The user performs an operation for receiving the reward in the game screen.

FIG. 10F shows an example of a chat room view 163, which is displayed in the user terminal 10A when user B receives a reward at a timing earlier than user A. The chat room view 163 is a view of the chat room for user A and user B. The chat room view 163 displays a reception state notification 164. The reception state notification 164 is displayed in association with user B, who serves as a sender. The reception state notification 164 notifies user A that user B has received the reward. Further, the reception state notification 164 includes a selection part 165 and a message content indicating that user B has received the reward. When the selection part 165 is selected, the user terminal 10A requests for web data of the game, thereby being forwarded to the game, and the view transitions to, for example, a reward reception view or a top view of the game. When notification is made for the reception state of the reward of user B in such a manner, user A is prompted to receive the reward. Further, when the reception state notification 164 is displayed in the chat room for user A and user B instead of the chat room for user A and the game official account, user A can receive the reward in synchronization with user B.

Procedure for Each Process

Figure 11:
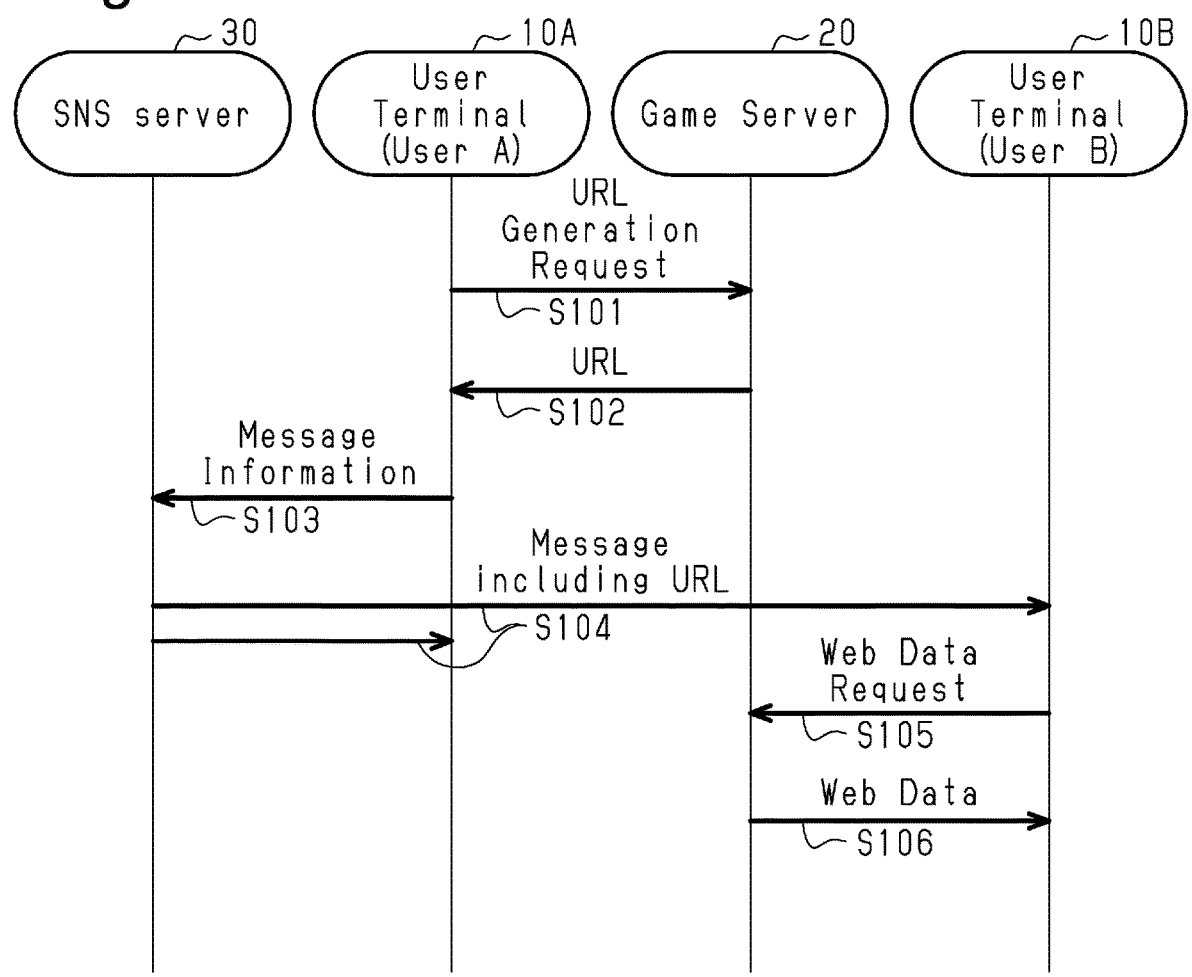
FIG. 11 is a sequence chart illustrating a procedure for the friend-to-friend sending method.

A procedure in which user A sends a message to user B, who is a friend, from the game using the friend-to-friend sending method will now be described with reference to FIG. 11. When a sending event of a message occurs and a friend user of a sending destination of the message is selected by an operation of user A, the user terminal 10A, which is used by user A, sends a URL generation request to the game server 20 (step S101).

The game server 20 generates a URL and sends the URL to the user terminal 10A (step S102). Further, the game server 20 obtains a notification message 280 corresponding to the sending for the friend, thereby sending the notification message 280 and the URL to the user terminal 10A.

When receiving the URL, the user terminal 10A sends, to the SNS server 30, message information including the URL, the chat room ID, and the message content (step S103).

The SNS server 30 sends a message based on the message information while setting the chat room of the received chat room ID as a sending destination (step S104). The message is sent to the chat room for user A and user B and thus displayed in the user terminal 10A and the user terminal 10B.

The user terminal 10B receives the message from the SNS server 30 and displays the message in the message application. When a selection part included in the message is selected by an operation of user B, the user terminal 10B specifies a URL embedded in the message to request the game server 20 for the web data 260 (step S105).

The game server 20 sends the requested web data 260 to the user terminal 10B (step S106). The in-app browser 52 of the user terminal 10B displays, on the display 14, a view that is based on the received web data 260.

Figure 12:
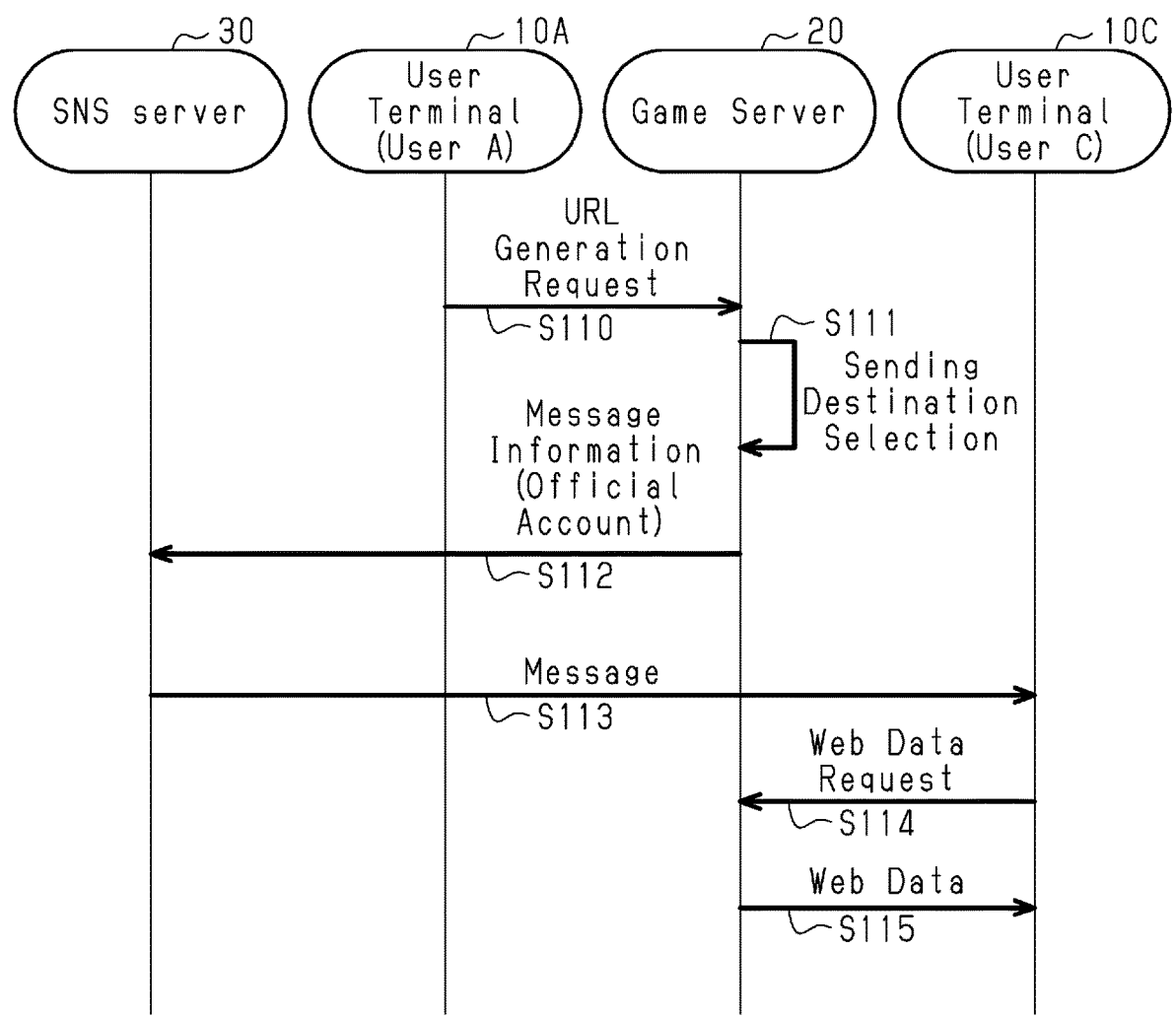
FIG. 12 is a sequence chart illustrating a procedure for the random sending method.

A procedure for the random sending in which user A sends a message to user C from the game via the official account will now be described with reference to FIG. 12. When a sending event of a message occurs and the random sending is selected, the user terminal 10A sends a URL generation request to the game server 20 (step S110).

When receiving the URL generation request, the game server 20 selects user C as the user of the sending destination of the message (step S111). The game server 20 may select the user based on the history of the user of the sending destination in the past, which is stored in the game information memory 27. Further, the game server 20 stores the selected user in the list in the game information memory 27.

The game server 20 generates a URL for forwarding the user terminal 10 to the game. Further, the agent 24 of the game server 20 sends, to the SNS server 30, message information including the URL as the sending destination of the chat room for user C and the game official account (step S112). Further, the game server 20 obtains a notification message 280 corresponding to the sending for the friend, thereby sending the notification message 280 and the URL to the user terminal 10A.

When receiving the message information, the SNS server 30 sends the message to the chat room for the game official account and user C based on the message information (step S113).

The user terminal 10C receives the message from the SNS server 30 and displays the message in the chat room for user C and the official account of the message application. When a selection part included in the message is selected by an operation of user C, the user terminal 10C requests the game server 20 for the web data 260 of a URL embedded in the message (step S114). When responding to the message, the user terminal 10C updates the information related to user C of the list stored in the game information memory 27 such that the information indicates that the user terminal 10C has responded to the message.

The game server 20 sends the requested web data 260 to the user terminal 10C (step S115). The in-app browser of the user terminal 10C displays, on the display 14, a view based on the received web data.

Figure 13:
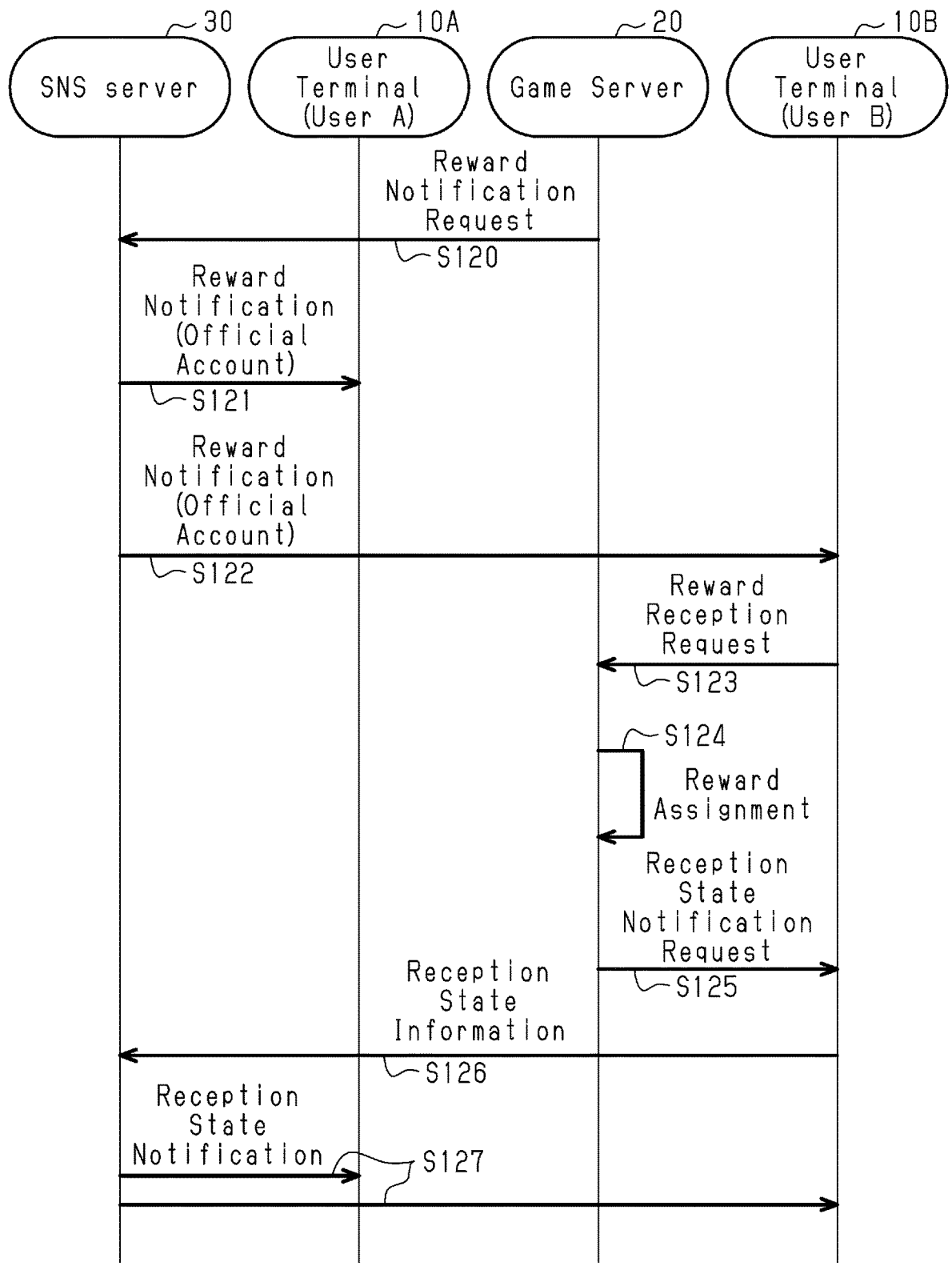
FIG. 13 is a sequence chart illustrating a procedure for receiving a reward.

A method for notifying a user of the situation of a notification event when a notification target event occurs will now be described with reference to FIG. 13. It is assumed that the association of a reward, which is a notification target event common to user A and user B, has occurred and user A has received a reward at a timing earlier than user B.

The agent 24 of the game server 20 sends, to the SNS server 30, reward notification requests for the chat room for user A and the game official account and the chat room for user B and the official account (step S120). The SNS server 30 sends a reward notification to the chat room for user A and the game official account (step S121). Further, the SNS server 30 sends a reward notification to the chat room for user B and the game official account (step S122).

When sending the reward reception request at a timing earlier than the user terminal 10A (step S123), the game server 20 performs a process for assigning the reward to user B (step S124). For example, associating the reward with user B causes the game server 20 to store the reward in the game user information 270, with the reward owned by user B.

Additionally, the game server 20 sends, to the user terminal 10B, the request for a reception state notification notifying user A that user B has received the reward (step S125). The native unit 51 of the user terminal 10B sends the reception state information to the SNS server 30 while setting the chat room for user A and user B as the sending destination (step S126).

The SNS server 30 sends the reception state notification to the chat room for user A and user B based on the reception state information (step S127). The message is sent to the chat room for user A and user B and thus displayed in the user terminal 10A and the user terminal 10B. The reception state notification includes the fact that user B has received the reward, the URL of a view where the reward can be received, and the like. When the URL is selected by an operation of user A, the user terminal 10A transitions to the game view and displays the reward reception view on the display 14. User A receives the reward on the reward reception view.

The above-described embodiment has the following advantages.

(1) The user terminal 10 uses the friend-to-friend message sending method to display a message sent from a friend user on the display 14 while setting another user as a sender. By contrast, the terminal 10 displays a message sent using the random sending method on the display 14 while setting the game official account as a sender. That is, in the random sending method, the user, who is the sender of the message, is not notified of its sending destination. That is, in the random sending method, the user, who is the recipient of the message, is not notified of its sender. This limits unintentional connection and unintentional disclosure of information on an SNS while allowing users who are not friend users to send and receive to and from each other. Further, since the sender is not displayed for its recipient, it is not difficult for a user hesitating to send a message to an unknown user to send a message. In addition, since the recipient is not displayed for its sender, it is not difficult for a user hesitating to respond to a message from an unknown user to respond to a message. In such a manner, it is easy to send a message to another user. This promotes communication between users in the game and increases the number of people accessing the game.

(2) When sending a message to a friend, the user terminal 10 sends the message to the SNS server 30 while setting, as a sending destination, a chat room including a user serving as a sender and a user specified as a recipient. The user, who serves as the recipient of the message, tends to have a sense of affinity for friend users rather than the official account. Thus, the user can respond to the message easily by displaying the message in a chat room where the friend users are members.

(3) When the random sending method is used to send a message, at least a user logging in to the message application is selected as a sending destination. A user logging in to the message application is easily aware of a message from another user. Thus, a user who has received a message can easily respond to a message.

(4) When a message sending event occurs, a selection view is displayed. In the selection view, any one of a first message sending and a second message sending is selected. This allows a user to send a message at the user's wish.

(5) When a notification target event shared by multiple users occurs, the progress status of a notification target event of one user is notified to another user. This promotes the progress of the other user such as reception of a reward.

(6) A notification about a notification target event shared by multiple users is notified to a chat room that includes these users as members. This allows for synchronization with a user who progresses in an advanced manner, for example, a user who has received a reward at an earlier timing, and prompts the progress of another user to further proceed.

(7) The user can obtain a reward by responding to a message and satisfying the reward assigning condition in a forwarded game. Thus, incentives for participating in the game can be assigned to the user.

The above-described embodiment may be modified as follows. The above-described embodiment and at least one of the following modifications can be combined as long as the combined modifications remain technically consistent with each other.

In the above-described embodiment, description is made on a notification for receiving a reward when a message is sent using the friend-to-friend sending method. In addition to this, the reception notification may be sent to the user terminal 10 when a message is sent using the random sending method. In the same manner as the case in which a message is sent using the friend-to-friend sending method, the game server 20 issues a reward notification request for the SNS server 30. The SNS server 30 transmits the reward notification while setting the chat room for user A and the game official account as a sending destination. Further, the SNS server 30 transmits the reward notification while setting the chat room for user C and the game official account as a sending destination.

It is assumed that user C performs an operation for receiving a reward using the user terminal 10C at a timing earlier than user A. In this case, the user terminal 10C accepts the operation for receiving the reward on a view of the game displayed by the in-app browser 52.

The user terminal 10C accepts the operation for receiving the reward to send a reward reception request to the game server 20. When assigning the reward to user C, the agent 24 of the game server 20 sends a request for the reception state notification to the SNS server 30 while setting the chat room for user C and the game official account as a sending destination.

When receiving the request for the reception state notification, the SNS server 30 sends the reception state notification while setting the chat room for user C and the game official account as a sending destination (step S35). This allows user A to ascertain the reward reception state of user C even if user A does not know about user C.

In the above-described embodiment, when a user sends a message from a game to another user, the game server 20 obtains the notification message 280 stored in the notification message memory 28. Instead, when sending a message from the game, the user terminal 10 may obtain a notification message stored in the storage 13 in advance and send the notification message to the game server 20. This reduces calculation load on the game server 20.

In the above-described embodiment, in a case in which user B has received a reward to be assigned in the game at a timing earlier than user A, a reward reception notification is displayed in the chat room for user A and user B to notify user A that user B has received the reward. Instead of or in addition to this, a reward reception notification may be displayed in the chat room for user A and the game official account to notify user A that user B has received the reward.

In the above-described embodiment, a message content is determined based on template data of a message stored in the game server 20 either in the case of the friend-to-friend sending method or the random sending method. Instead, at least in the friend-to-friend sending method, a user serving as the sender of the message may be able to input any message using the input operation device 15 of the user terminal 10. In the friend-to-friend sending method, for example, at a timing after the URL is obtained (step S4 in FIG. 3) and before message information is sent to the SNS server 30 (step S6 in FIG. 3), the user terminal 10 obtains a message input by the user. Further, in the random sending method, for example, at a timing before the message sending request is sent (step S11 in FIG. 4), the user terminal 10 obtains the message input by the user and sends the message and the message sending request. Alternatively, the SNS server 30, which has obtained a URL and a chat room ID, may inquire the user terminal 10 about whether the message needs to be input.

In the above-described embodiment, in the random sending method, a message is sent to one user selected by the game server 20. Instead, in the random sending method, a message may be sent to a chat room including multiple users selected by the game server 20. In this case, there are a multiple number of recipients of a message using the random sending method. Thus, it is expected that any one of the users responds to the message within a shorter time.

In the above-described embodiment, as a notification target event, when a reward is associated with multiple users, the reception state of the reward of one user is notified to the other user (FIG. 5 and FIGS. 10A to 10F). The notification target event is not limited to the association of a reward. The notification target event may be, for example, holding of a game event, appearance of a new game medium, or the fact that the play status of another user is in a predetermined status.

In the above-described embodiment, a message is sent and received in a game that operates from the message application. Instead, a message may be sent and received in a game including an SNS function. In such a configuration, the game server 20 may be the same server as the SNS server 30. In this case, whereas a message is displayed in association with the account of a user serving as a sender when a message is sent to a friend, and a message is associated with the management account of the game in the random sending method. Thus, the same advantage as the above-described embodiment can be obtained.

In the above-described embodiment, when a game-related message is sent to a friend on the message application, the message is sent to a user who is playing the game and is a friend on the message application. Instead, a message may be sent to a user who is not playing the game and is a friend on the message application. When this friend responds to the message and accesses the game using the user terminal, views such as an installation view and a guidance view of the game may be displayed. Further, when this friend responds to the message and accesses the game using the user terminal, the reward may be assigned to at least one of the friend user and the user who sent the message.

In the above-described embodiment, the message application 50 is a hybrid application that can execute processes by a native application and processes by a web application. Instead, the message application may be a native application that is implemented in the user terminal 10 to operate an OS or a web application. Alternatively, the message application may be an application in which a game application serving as a native application is combined with a message application serving as a native application.

In the above-described embodiment, description is made on an example of a game collaborating with an SNS provided on the platform of the SNS. Further, in the above-described embodiment, an SNS is defined as service that allows at least a user to post information on an individual page set for the user. For example, an SNS does not necessarily have to include an individual page. Further, a game collaborating with an SNS does not have to be a game provided by the platform of the SNS. That is, in the game, a message simply needs to be sent to other users, and the relationship with the SNS is not limited. Such an application includes, for example, a chat application that chronologically displays messages of each user in a timeline region. Alternatively, such an application may be a game that does not collaborate with an SNS but collaborates with a communication tool with friends in the real world, such as a chat application (message application). In this case, the SNS server 30 is a chat server or a message server.

In the above-described embodiment, the program for processing a game is stored in the storage medium of the user terminal 10. Instead of or in addition to this, some or all of the program may be stored in a storage medium other than the storage medium of the user terminal 10. The storage medium may be incorporated in the game server 20 or the SNS server 30.

Alternatively, the storage medium may be incorporated in other server devices. As another option, the program may be stored in a distributed manner in the storage medium of the game server 20, the storage medium of the SNS server 30, and the storage media of other server devices.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A system for processing a game, the system comprising user terminals that include a first user terminal and a second user terminal, a first server, and a second server, wherein
the first user terminal includes circuitry configured to:
during execution of the game, output, to a message application, a first message sending request for sending a message to the second user terminal while indicating a first user of the first user terminal as a sender, wherein a second user of the second user terminal belongs to the same group as the first user or is approved by the first user, and the message includes identification information that allows the second user terminal that has received the message to be forwarded to the game; and
during the execution of the game, send, to the first server, a second message sending request for sending the message without specifying a recipient, and
the first server includes circuitry configured to:
responsive to receiving the second message sending request, select a third user specified as the recipient of the message; and
send, to the second server, a third message sending request for sending the message to a third user terminal of the third user without notifying the third user terminal of information related to the first user while specifying the third user as the recipient and indicating, to the third user, a game management account as the sender of the message.

2. The system according to claim 1, wherein the circuitry of the first user terminal is further configured to specify, as a sending destination of the message, the group including at least the first user and the second user specified by the first user.

3. The system according to claim 1, wherein the circuitry of the first server is further configured to select, as the recipient of the message, at least a user logging into the message application.

4. The system according to claim 1, wherein
the first user terminal includes a display, and
the circuitry of the first user terminal is further configured to, responsive to occurrence of a message sending event, control the display to display a view that allows the first user to select the first message sending request and the second message sending request.

5. The system according to claim 1, wherein the circuitry of the first server is further configured to, responsive to occurrence of an event shared by users including the first user and the second user, send, to the second server, a request for notifying the second user of a progress status of the event of the first user.

6. The system according to claim 5, wherein the circuitry of the first server is further configured to send, to the second server, a request for notifying of the progress status of the event while specifying the group of the users including the first user and the second user as a sending destination.

7. The system according to claim 1, wherein
the first server is a server that provides the game, and
the second server is an SNS server.

8. A method for processing a game using a system including user terminals that include a first user terminal and a second user terminal, a first server, and a second server, wherein the first user terminal includes circuitry and the first server includes circuitry, the method comprising:
by the circuitry of the first user terminal, selectively performing
during execution of the game, outputting, to a message application, a first message sending request for sending a message to the second user terminal while indicating a first user of the first user terminal as a sender, wherein a second user of the second user terminal belongs to the same group as the first user or is approved by the first user, and the message includes identification information that allows the second user terminal that has received the message to be forwarded to the game, and
during the execution of the game, sending, to the first server, a second message sending request for sending the message without specifying a recipient;
by the circuitry of the first server, responsive to receiving the second message sending request, selecting a third user specified as the recipient of the message; and
by the circuitry of the first server, sending, to the second server, a third message sending request for sending the message to a third user terminal of the third user without notifying the third user terminal of information related to the first user while specifying the third user as the recipient and indicating, to the third user, a game management account as the sender of the message.

9. An information processor connected to one or more servers, the information processor comprising circuitry, the information processor being a first information processor, wherein the circuitry is configured to:
during execution of a game, output, to a message application, a first message sending request for sending a message to a second information processor while indicating a first user of the first information processor as a sender, wherein a second user of the second information processor belongs to the same group as the first user or is approved by the first user, and the message includes identification information that allows the second information processor that has received the message to be forwarded to the game; and
during the execution of the game, send, to a first server of the one or more servers, a second message sending request for sending the message without specifying a recipient, wherein the second message sending request causes circuitry of the first server to
- select a third user specified as the recipient of the message, and
- send, to a second server of the one or more servers, a third message sending request for sending the message to a third information processor of the third user without notifying the third information processor of information related to the first user while specifying the third user as the recipient and indicating, to the third user, a game management account as the sender of the message.

10. A method for processing a game by an information processor connected to one or more servers, the information processor including circuitry, wherein the information processor is a first information processor, the method comprising, by the circuitry, selectively performing:

during execution of the game, outputting, to a message application, a first message sending request for sending a message to a second information processor while indicating a first user of the first information processor as a sender, wherein a second user of the second information processor belongs to the same group as the first user or is approved by the first user, and the message includes identification information that allows the second information processor that has received the message to be forwarded to the game; and during the execution of the game, sending, to a first server of the one or more servers, a second message sending request for sending the message without specifying a recipient, wherein the second message sending request causes circuitry of the first server to
- select a third user specified as the recipient of the message, and
- send, to a second server of the one or more servers, a third message sending request for sending the message to a third information processor of the third user without notifying the third information processor of information related to the first user while specifying the third user as the recipient and indicating, to the third user, a game management account as the sender of the message.

11. The system according to claim 1, wherein
the circuitry of the first server is configured to send, to the second server, the third message sending request for sending the message to the third user terminal without displaying the information related to the first user to the third user terminal.

* * * * *